(12) United States Patent
Maeda

(10) Patent No.: US 7,839,748 B2
(45) Date of Patent: Nov. 23, 2010

(54) INFORMATION REPRODUCING APPARATUS AND METHOD

(75) Inventor: Takeshi Maeda, Koganei (JP)

(73) Assignee: Hitachi, Ltd., Tokyo (JP)

( * ) Notice: Subject to any disclaimer, the term of this patent is extended or adjusted under 35 U.S.C. 154(b) by 1108 days.

(21) Appl. No.: 11/501,046

(22) Filed: Aug. 9, 2006

(65) Prior Publication Data
US 2007/0274186 A1  Nov. 29, 2007

(30) Foreign Application Priority Data
May 24, 2006  (JP)  ............... 2006-144262

(51) Int. Cl.
*G11B 7/0045*  (2006.01)
(52) U.S. Cl. .............. 369/59.11; 369/47.5; 369/47.28; 369/53.23; 369/53.31; 369/59.12; 369/59.13; 369/59.14; 369/59.15; 369/59.16; 369/59.17; 369/59.18; 369/59.19; 369/59.2; 369/59.21; 369/116
(58) Field of Classification Search ............... None
See application file for complete search history.

(56) References Cited

U.S. PATENT DOCUMENTS

| 5,985,401 | A | 11/1999 | Yamamoto et al. |
| 6,240,056 | B1 | 5/2001 | Tanase et al. |
| 6,314,070 | B1 | 11/2001 | Tanase et al. |
| 6,324,137 | B2 | 11/2001 | Tanase et al. |
| 6,327,232 | B2 | 12/2001 | Tanase et al. |
| 6,587,410 | B1 * | 7/2003 | Suzuki et al. ............ 369/47.28 |
| 2001/0012251 | A1 | 8/2001 | Tanase et al. |
| 2001/0014065 | A1 | 8/2001 | Tanase et al. |
| 2003/0008760 | A1 | 1/2003 | Yamamoto et al. |
| 2004/0170797 | A1 | 9/2004 | Yamamoto et al. |
| 2004/0170842 | A1 | 9/2004 | Yamamoto et al. |
| 2006/0002281 | A1 * | 1/2006 | Lee et al. ................. 369/116 |
| 2007/0177476 | A1 * | 8/2007 | Yamamoto et al. ....... 369/59.11 |

FOREIGN PATENT DOCUMENTS

| JP | 10-040547 | 2/1998 |
| JP | 10-340482 | 12/1998 |
| JP | 2007-207356 | 8/2007 |

\* cited by examiner

*Primary Examiner*—Joseph H Feild
*Assistant Examiner*—Ifedayo Iluyomade
(74) *Attorney, Agent, or Firm*—Antonelli, Terry, Stout & Kraus, LLP.

(57) ABSTRACT

There is provided an optical information recording/reproducing apparatus capable of obtaining a high super-resolution effect using an optical information recording medium in which a super-resolution thin film is formed. An optical information recording medium 1 having a super-resolution layer is irradiated with a laser light in a light emission pattern such that a bias light emission portion that does not cause the super-resolution layer to be in the state of super-resolution and a pulse light emission portion that causes the super-resolution layer to be in the state of super-resolution alternatively appear, and reflected light is detected. A reproduction signal based on the pulse light emission portion and a reproduction signal based on the bias light emission portion are acquired. The results obtained by performing an arithmetic processing on the reproduction signal based on the bias light emission portion and the reproduction signal based on the pulse light emission portion are outputted as reproduction data.

8 Claims, 16 Drawing Sheets

INFORMATION REPRODUCING APPARATUS AND METHOD

CLAIM OF PRIORITY

The present application claims priority from Japanese application JP 2006-144262 filed on May 24, 2006, the content of which is hereby incorporated by reference into this application.

BACKGROUND OF THE INVENTION

1. Field of the Invention

The present invention relates to an information reproducing apparatus and an information reproducing method for reproducing information from a large-capacity optical information recording medium having a high super-resolution effect.

2. Background Art

With the recent development of the information society involving optical communications, the construction of a communication system that enables high-speed communication of large-capacity information is being demanded. As an optical device indispensable for achieving such large-capacity, high-speed optical communication, an optical information recording/reproducing apparatus for storing large-capacity optical information is used. Further, in association with higher resolution, such as digitalization or higher definition of an image for television, it is urgent to develop a large-capacity optical information recording/reproducing apparatus capable of recording such image in a high-resolution state for long periods of time.

Currently, as an optical information recording medium, DVDs having a capacity of 4.7 GB per side are widely used for handling large-capacity moving images such as videos, besides computer applications. With regard to such DVD, in addition to a read-only ROM (DVD-ROM), on the substrate of which information is directly written, a rewritable recording/reproducing medium is being put to practical use. The development for improving the recording density of such optical information recording medium is being carried out, and as a means for achieving higher density of information recording, a laser light with a wavelength of 650 nm that is shorter than that (780 nm) of a laser used for CDs or the like is used. However, in order to deal with large-capacity information, such as computer graphics or digital high-definition images, it is necessary to achieve a recording density four or five times higher than such medium. For this, an optical disk utilizing a blue semiconductor laser with an even shorter wavelength (405 nm) is being developed, and an optical disk having a capacity of 23.3 GB per side is being put to practical use.

As a technology for achieving even higher capacity for optical disks, a multilayer recording system, a multi-value recording system, a super-resolution recording system, and the like are being developed. Among such next-generation technologies for achieving a higher capacity, the super-resolution recording system is one of the most effective technologies for achieving a higher capacity.

The super-resolution recording system is a recording system in which a recording surface is irradiated with a laser beam, the diameter of the laser beam emitted being reduced by a laser beam condensing function or a mask function due to a super-resolution layer, and it is a large-capacity recording system utilizing reversible change in optical constants (refractive index (n) and extinction coefficient (k)) of a super-resolution layer formed in a multilayer film structure including a recording layer, a protective layer, a reflective layer, and the like in an optical disk. When the super-resolution layer is irradiated with a laser light used for reading and writing, the temperature is increased or the layer is caused to be excited due to photon absorption by the light. The refractive index and extinction coefficient are reversibly changed only during the laser light irradiation, and the original state is restored when the laser light irradiation ceases. In an optical disk, information is reproduced by irradiating the disk with a laser light, and determining a recorded part and a non-recorded part by the amount of light that returns to a pick-up after reflected by the disk. By utilizing such change in reversible optical constants of the super-resolution layer, the region of the light that returns to the pick-up can be made smaller than the area irradiated with a general irradiation laser light. Namely, by reducing the region to be read based on an optical masking effect, it is possible to improve resolution. Meanwhile, the extinction coefficient (k) used herein is the amount proportional to optical absorption coefficient of a material, and the larger the absorption coefficient of a material, the greater the value will be. Further, the two constants, that is, the refractive index (n) and extinction coefficient (k), are collectively referred to as optical constants.

As disclosed in JP Patent Publication (Kokai) No. 10-340482 (1998) A, a cobalt oxide-based thin-film material or the like has been used for such super-resolution layer. A large-capacity optical disk can be obtained through a super-resolution effect based on a large change in refractive index of the thin film. In a current optical information recording/reproducing apparatus, when optical information is reproduced, continuous light (CW light: Continuous Wave light) or reproduction laser light that is superimposed at a high frequency of approximately 400 MHz is emitted. Thus, if the complex refractive index of the above super-resolution layer is changed, and the power of the reproduction light is increased until the super-resolution effect is obtained, heat is accumulated on the optical information recording medium due to the laser light irradiation, thereby causing a problem that a broad heat distribution develops in the laser beam spot and a super-resolution mask with high contrast cannot be formed. Furthermore, there is a concern that a thin film or a recording pit on the medium deteriorates due to accumulation of the heat, whereby operation characteristics of repetitive reproduction deteriorate.

JP Patent Publication (Kokai) No. 10-40547 (1998) A or the like discloses a reproduction system utilizing a pulsed light, as a system for improving the super-resolution effect by preventing the accumulation of such heat in a medium and making the temperature gradient in a beam spot to have a sharp inclination.

Patent Document 1: JP Patent Publication (Kokai) No. 10-340482 (1998) A

Patent Document 2: JP Patent Publication (Kokai) No. 10-40547 (1998) A

SUMMARY OF THE INVENTION

When employing a pulse reproduction system as disclosed in JP Patent Publication (Kokai) No. 10-40547 (1998) A or the like, a fast material response is necessary. Further, since a beam spot in the state of super-resolution is formed of a superposition of a beam spot in a steady state and a beam spot in the state of super-resolution, it is influenced by the beam spot in the steady state. Thus, it is difficult to obtain a sufficient super-resolution mask.

It is an object of the invention to provide an optical information recording medium in which a super-resolution thin film having a fast response and high heat stability is formed, and an optical information recording/reproducing apparatus that can obtain a high super-resolution effect using the medium.

In the present invention, the optical information recording medium having a super-resolution layer is irradiated with a laser light in accordance with a light emission pattern such that a bias light emission portion that does not cause the super-resolution layer to be in the state of super-resolution and a pulse light emission portion that causes the super-resolution layer to be in the state of super-resolution alternatively appear, and then reflected light is detected. A reproduction signal based on the pulse light emission portion and a reproduction signal based on the bias light emission portion are obtained. The results obtained through an arithmetic processing of the reproduction signal based on the bias light emission portion and the reproduction signal based on the pulse light emission portion is outputted as reproduction data.

The arithmetic processing includes a calculation by which the reproduction signal of the bias light emission portion that is multiplied by a constant is subtracted from the reproduction signal from the pulse light emission portion. Further, the arithmetic processing is carried out after the reproduction signal of the bias light emission portion that is produced at the same time as the reproduction signal of an arbitrary pulse light emission portion is obtained through interpolation based on the reproduction signals of the bias light emission portions that are adjacent to the reproduction signal of the arbitrary pulse light emission portion in terms of time.

In the information reproducing apparatus of the present invention, the optical information recording medium is irradiated with a pulsed laser light having a greater light emission frequency than a minimum-mark frequency, the medium comprising an super-resolution layer having fast response capable of following such pulse width. Optical signals from the pulse portion and the bias light emission portion that does not involve pulse light emission are detected, and the arithmetic processing is conducted on those signals, so as to use the results as a reproduction signal.

As used herein, the state of super-resolution refers to a state in which part of a laser spot is masked and therefore optical resolution is increased, due to change of an optical constant caused by an increase in temperature due to a laser irradiation to the super-resolution layer. Further, the state other than the state of super-resolution is referred to as a steady state.

The super-resolution layer contains $Fe_2O_3$, $Co_3O_4$, NiO, CoO, ZnO, $Cr_2O_3$, ZnS—ZnSe, GaN—InN, or $Ga_2O_3$, preferably, $Fe_2O_3$ or $Ga_2O_3$.

In accordance with the present invention, since a super-resolution mask having a high contrast can be formed, an optical information recording/reproducing apparatus with higher density than before can be obtained. Furthermore, temperature can be increased without deteriorating the super-resolution layer or other optical information recording media. Thus, an optical information recording/reproducing apparatus with higher reliability than before can be obtained.

DESCRIPTION OF THE PREFERRED EMBODIMENTS OF THE INVENTION

An optical information recording apparatus having a recording density over 1.5 times greater than that of a conventional one was obtained by using an optical information recording medium containing $Fe_2O_3$ and $Ga_2O_3$ as a super-resolution layer, under the conditions that, a pulse width was set to be 3 ns, a pulse period was set to be 8 ns, a light emission power of a pulse light emission portion was set to be 6 mW, and a light emission power of a bias light emission portion, when there is no pulse irradiation, was set to be less than 0.8 mW, and the difference between a reproduction signal from the pulse light emission portion and a reproduction signal from the bias light emission portion was used as a reproduction signal.

EXAMPLE 1

Figure 1:
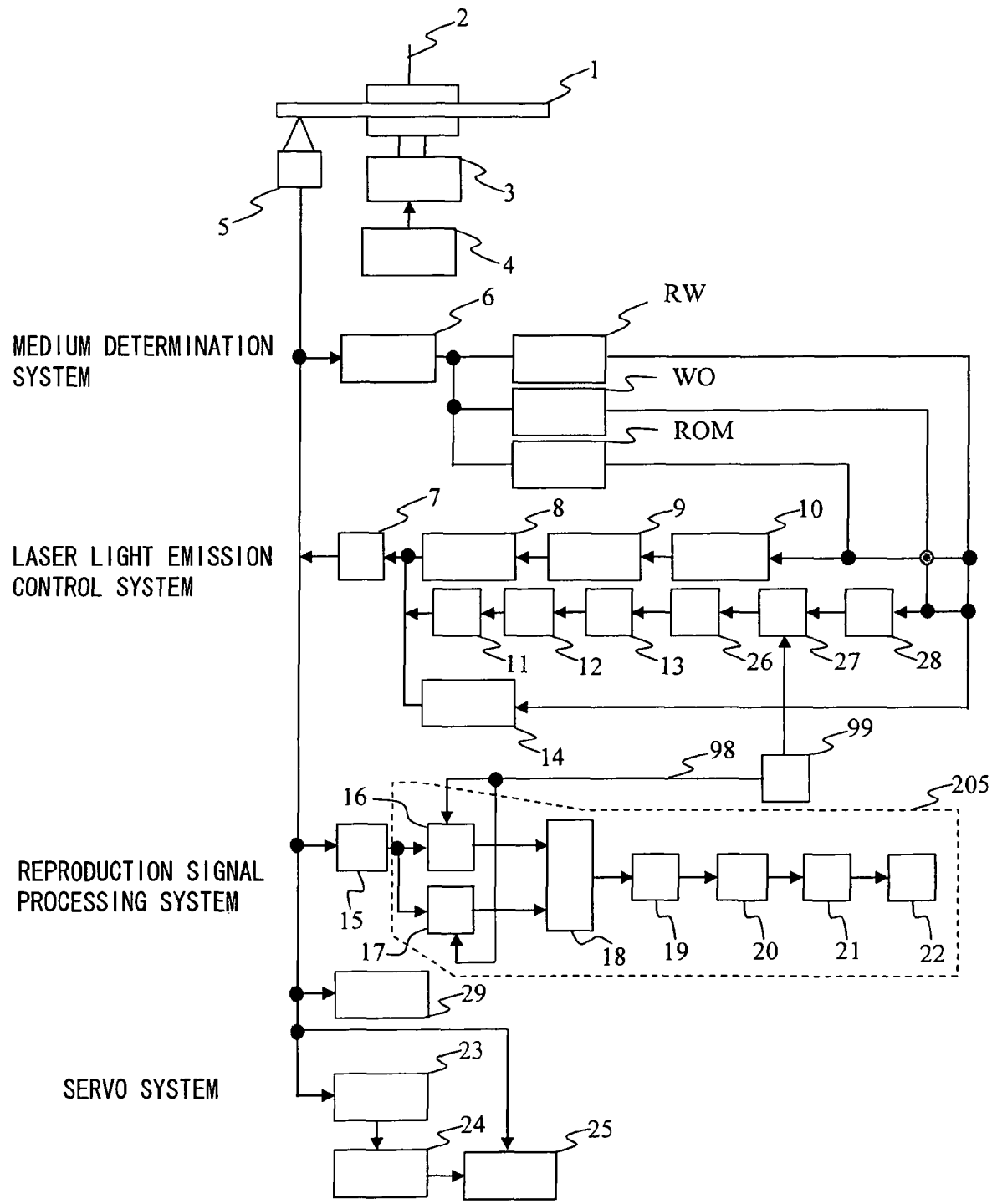
FIG. 1 shows a block diagram of an information recording/reproducing apparatus according to the present invention.

FIG. 1 shows a block diagram of an example of an optical information recording/reproducing apparatus according to the present invention. In FIG. 1, numeral 1 denotes an optical information recording medium, numeral 2 denotes a spindle, numeral 3 denotes a spindle motor, numeral 4 denotes a motor circuit control means, numeral 5 denotes a pick-up, numeral 6 denotes a medium determination means, numeral 7 denotes a laser driver, numeral 8 denotes a reproduction power DC amplifier, numeral 9 denotes a reproduction peak power determination means, numeral 10 denotes a reproduction bias power determination means, numeral 11 is a recording power DC amplifier, numeral 12 denotes a recording peak power determination means, numeral 13 denotes a recording peak power ratio determination means, numeral 14 denotes an erase power DC amplifier, numeral 15 denotes a reproduction signal detecting means, numeral 16 denotes a peak sampling means, numeral 17 denotes a bias sampling means, numeral 18 denotes a differential reproduction signal arithmetic processing means, numeral 19 denotes an address reading means, numeral 20 denotes a clock synchronizing means, numeral 21 denotes a reproduction signal demodulating means, numeral 22 denotes a reproduction data transmitting means, numeral 23 denotes a tracking error detecting means, numeral 24 denotes an information controller, numeral 25 denotes a pick-up control circuit, numeral 26 denotes a record timing correction means, numeral 27 denotes a record data modulating means, numeral 28 denotes a record data receiving means, numeral 29 denotes a pick-up transferring driver, and numeral 99 denotes a clock as the basis of a disk drive.

The optical information recording/reproducing apparatus of the invention includes the medium determination means 6 for determining the type of the optical disk 1 as a recording medium. The optical disk can be categorized into an RW (Re-Writable), recordable (Write Once), or ROM (Read Only Memory) type. In the laser light emission control system as described below, when the optical disk inserted is a ROM disk, only the reproduction system is driven. When a WO disk is inserted, the reproduction and recording systems are driven. When a RW disk is inserted, the erasing system is also driven in addition to the reproduction and recording systems. The optical disk is fixed to the spindle 2, and it is temporarily fixed to a rotating mechanism that is directly or indirectly connected to the rotating shaft of the spindle motor 3 controlled by the motor circuit control means 4. Information in the optical disk is read as an optical signal via a laser, which is a light source in the pick-up 5, and a detection unit for detecting reflected light. Further, information is recorded in the optical disk via the light source in the pick-up. The position of the pick-up is determined in the direction of a track with the pick-up transferring driver 29.

A laser light emission control unit is categorized into the reproduction system, the recording system, and the erasing system. In the reproduction system, for carrying out a pulse reproduction of the invention, the reproduction power DC amplifier 8, reproduction peak power determination means 9, and reproduction bias power determination means 10 are provided. A pulse reproduction waveform of a reproduction light is formed and a light emission portion is transmitted to the laser driver 7 and the pick-up 5, such that a pulsed laser is emitted.

In the recording system, upon data recording, record data is inputted from the record data receiving means 28, and the data is modulated via the record data modulating means 27 in accordance with a clock generated by the clock generating means 99. The data is then inputted to the laser driver via the record timing correction means 26, and the light source in the pick-up is controlled. An output from the recording peak power ratio determination means 13 is inputted to the pick-up 5 via the recording peak power determination means 12, recording power DC amplifier 11, and laser driver 7, so as to control the light source in the pick-up. Further, in the erasing system, data is inputted to the laser driver 7 via the erase power DC amplifier 14, so as to control the light source in the pick-up.

An optical signal obtained for reproduction is processed by a reproduction signal processing system. Optical information detected by the reproduction signal detecting means 15 is separated into a pulse light emission portion and a bias light emission portion via the peak sampling means 16 and bias sampling means 17, in accordance with a sample pulse from the clock generating means 99. The signal arithmetic processing means 18 performs an arithmetic processing on the two signals, and the output is demodulated by the reproduction signal demodulating means 21 after the address reading means 19 and the clock synchronizing means 20. The data is outputted to the outside through the reproduction data transmitting means 22. The reproduction data may be outputted via a given output means such as a display device or a speaker. Alternatively, the data may be processed by an information processing device such as a personal computer.

Since an optimum focal position and focal depth vary depending on the thickness of the substrate or the cover glass of an optical disk, the apparatus was structured such that auto-focusing would be enabled. Further, the disk was provided with a focusing function layer, and another tracking error detecting means for higher recording density was separately provided in the tracking error detecting means 23 to deal with a thinner tracking width, whereby tracking suitable for a medium would be enabled. Information from the tracking error detecting means 23 was transmitted to the pick-up via the information controller 24 and the pick-up control circuit 25. Further, there was provided a mechanism that utilizes the difference in reflectivity of media, for determining the type of a medium. Thus, it was designed such that tracking would be automatically carried out in accordance with the type of a media.

A wavelength of 405 nm was used for a laser light source mounted in the pick-up. An objective lens with an NA (Numerical Aperture) of 0.85 for focusing the laser beam on the optical disk was used.

Figure 2:
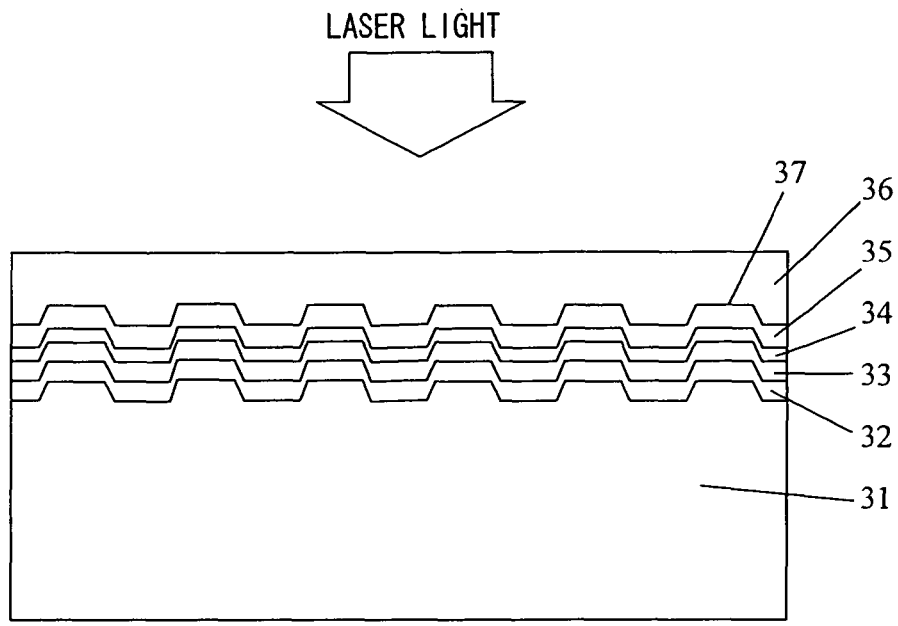
FIG. 2 schematically shows a cross-sectional view of a ROM-type optical information recording medium.

The characteristics of an optical information recording medium having the super-resolution effect of the invention were evaluated by using the optical information recording/reproducing apparatus shown in FIG. 1. First, a ROM disk was evaluated. FIG. 2 shows a cross-sectional view of a manufactured ROM-type optical information recording medium. In FIG. 2, numeral 31 denotes a substrate, numeral 32 denotes a reflective layer, numerals 33 and 35 denote protective layers, numeral 34 denotes a super-resolution layer, numeral 36 denotes a cover layer, and numeral 37 denotes a recording pit. In the ROM-type optical information recording medium of the present example, the recording pit 37 has a function as an optical information recording layer. In the present example, for obtaining a medium structure suitable for the optical system with the 405 nm laser wavelength and 0.85 NA, a polycarbonate substrate with an external diameter of 120 mm, an internal diameter of 15 mm, and a thickness of 1.1 mm was used for the substrate 31. Further, a polycarbonate sheet with an external diameter of 119.5 mm, an internal diameter of 23 mm, and a thickness of 0.1 mm was used for the cover layer 36. A reproduction laser was focused from the side of this cover layer 36, so as to reproduce information. The internal opening with an internal diameter of 15 mm of the substrate 31 was used as a chuck for the medium.

The ROM disk was manufactured by the following steps. First, a recording pit of a concave-convex pattern for a CN ratio test having a mark and a space at constant intervals was formed on a photoresist by using a laser lithography system.

The pit pattern was then photocopied to a Ni mold, and polycarbonate was injection-molded to the mold, thereby forming a substrate. The minimum pit size was set to 139 nm, and the depth of the pit was set to be 22 nm. The track pitch was set to be 320 nm.

A synthetic reflective film consisting of 95Ag-2.5Pd-2.5Cu (mol %) was formed on the manufactured substrate as the reflective layer 32. The film thickness was set to be 20 nm. The film was formed in pure Ar gas by DC magnetron sputtering. For protective films 33 and 35, amorphous films consisting of 80ZnS-20SiO$_2$ (mol %) were used. The films were formed in pure Ar gas by an RF sputtering process. A thin film consisting of 50Fe$_2$O$_3$-50Ga$_2$O$_3$ (mol %) was used as the super-resolution layer 34. The film was formed in gas consisting of 95Ar-5O$_2$ (flow percent) by RF sputtering. An oxide target having the same composition as the above was used as the sputtering target for forming this super-resolution layer.

After the films were formed by sputtering, the cover layer 36 was formed. UV curable resin was spin-coated on the substrate having a thickness of 1.1 mm, on which the thin films were formed, and then a polycarbonate cover layer having a thickness of 0.085 mm, which had been cut into a circular form having an external diameter of 119.5 mm and an internal diameter of 23 mm, was attached thereto. Next, the thus structured substrate was introduced into a vacuum chamber. The substrate and the sheet were caused to closely attach to each other by vacuum deaeration up to about 1 Pa. The UV curable resin was caused to be hardened by UV light irradiation from the side of the cover layer. The thickness of the UV resin was adjusted such that the total thickness of the UV curable resin and the cover layer would be 0.1 mm.

As for signals, a recording pit and a space that correspond to recording signals 2T, 3T, . . . , 8T with respect to a clock signal (1T=69.5 nm) were repeatedly recorded. Only one type of recording signals was formed on a particular track, and different signals were recorded on individual tracks. In this example, the recording pit length of a signal having a minimum mark 2T was set to be 139 nm, and the recording pit length of a signal having a maximum-length mark 8T was set to be 556 nm. Further, a mirror surface portion, in which the above recording pit was not present, was formed concentrically with the optical disk in the form of a ring on the substrate 31. This mirror surface portion is referred to as a mirror surface. By measuring the amount of light reflected from the mirror surface, nonlinearity of the super-resolution layer 34 can be evaluated.

The output of the above repetitive signal was observed on an oscilloscope. It can be concluded that the greater the amplitude ratio (resolution) of a small mark, such as 2T or 3T, with respect to the signal amplitude from the maximum-length mark (8T), the better the resolution of the minimum mark. In the invention, the amplitude ratio from the maximum-length mark is defined as $I_{8pp}$, the amplitude ratio of a measured mark nT (n=2 to 7) as $I_{npp}$, and resolution (Mod) as the following equation (1).

$$\mathrm{Mod} = \frac{I_{npp}}{I_{8pp}} \quad (1)$$

Figure 3:
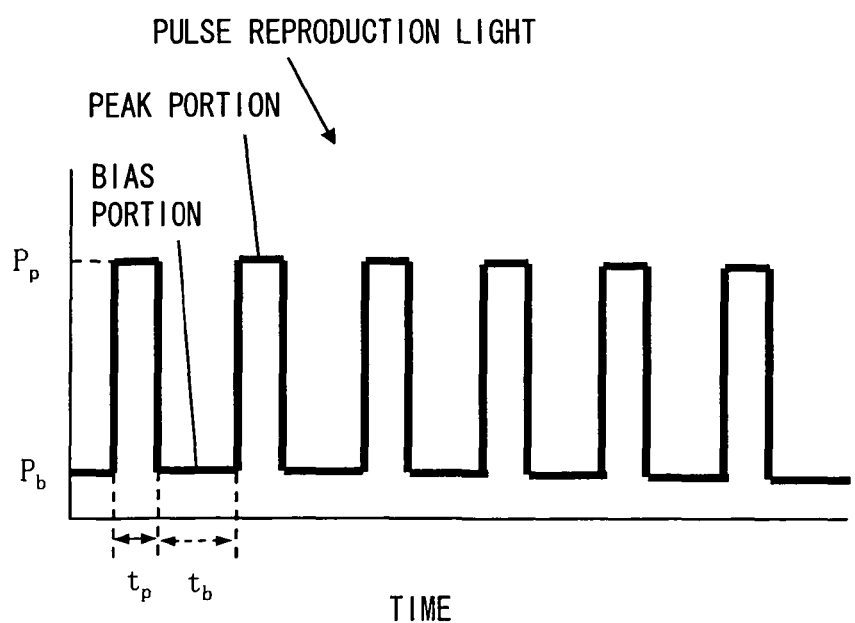
FIG. 3 shows a schematic diagram of a light emission pattern during pulse reproduction of the invention.

Reproduction was conducted by irradiating the optical information recording medium shown in FIG. 2 with pulsed light. FIG. 3 shows the light emission pattern of the pulsed light used. In FIG. 3, $P_p$ is the light emission power of a pulse light emission portion, and $P_b$ is the light emission power of a bias light emission portion. Further, $t_p$ is the light emission time of the pulse light emission portion, and $t_b$ is the light emission time of the bias light emission portion. In the present example, $P_p$ was set to be between 0.8 mW and 6 mW, and $P_b$ was set to be 0.3 mW or greater and less than 0.8 mW. In this way, the pulse light emission portion can cause the super-resolution layer to be in the state of super-resolution, and the bias light emission portion can keep the super-resolution layer in the steady state.

Furthermore, $t_p$ was set to be between 1 and 5 ns, and $t_b$ between 5 and 13 ns. The linear velocity of location of the optical disk was set to be 4.56 m/s. Thus, the time required for passing the minimum mark 2T is 30.5 ns, and sampling is possible with 3.8 pulses, in a case where $t_p$=3 ns and $t_b$=5 ns.

Generally, even when a laser spot is in the state of super-resolution, since reflectivity is not zero when it is not in the state of super-resolution, a signal that is not in the state of super-resolution is added to a signal that is in the state of super-resolution. It is possible to obtain only the signal output that is in the state of super-resolution by performing an arithmetic processing on the output during a steady state, not the state of super-resolution, that is, during a low laser power at the bias light emission portion, with respect to the output during a high light emission power at the pulse light emission portion in the state of super-resolution, as expressed by equation (4).

An effective reproduction power $P_r'$ in the case of pulse reproduction was obtained by equation (2).

$$P_r' = P_b + \frac{t_p}{(t_p + t_b)} \cdot P_p \quad (2)$$

A specific example of the above arithmetic processing will be described in detail. It is conceivable that a beam spot in the sate of super-resolution is formed based on the sum of a linear portion beam spot that is not in the state of super-resolution and a nonlinear beam spot in the state of super-resolution. Thus, in principle, a reproduction signal in the state of super-resolution alone can be obtained by subtracting a normal beam spot (normally Gaussian distribution) portion from an overall beam spot that is in the state of super-resolution. For obtaining the state of super-resolution, a high-power reading laser light is emitted; however, the beam spot intensity of the liner portion also increases. Thus, for properly estimating the beam spot in the state of super-resolution, a further accurate arithmetic processing is the method by which the linear portion beam spot is multiplied by a constant and the product is subtracted from the beam spot in the state of super-resolution. In accordance with the reproduction method utilizing the pulse signal, a normal beam spot that is not in the state of super-resolution is always sampled and it is referenced to an adjacent beam spot in the state of super-resolution, whereby super-resolution reproduction can be achieved with a high degree of accuracy. A specific method will be described in the following.

Figure 4:
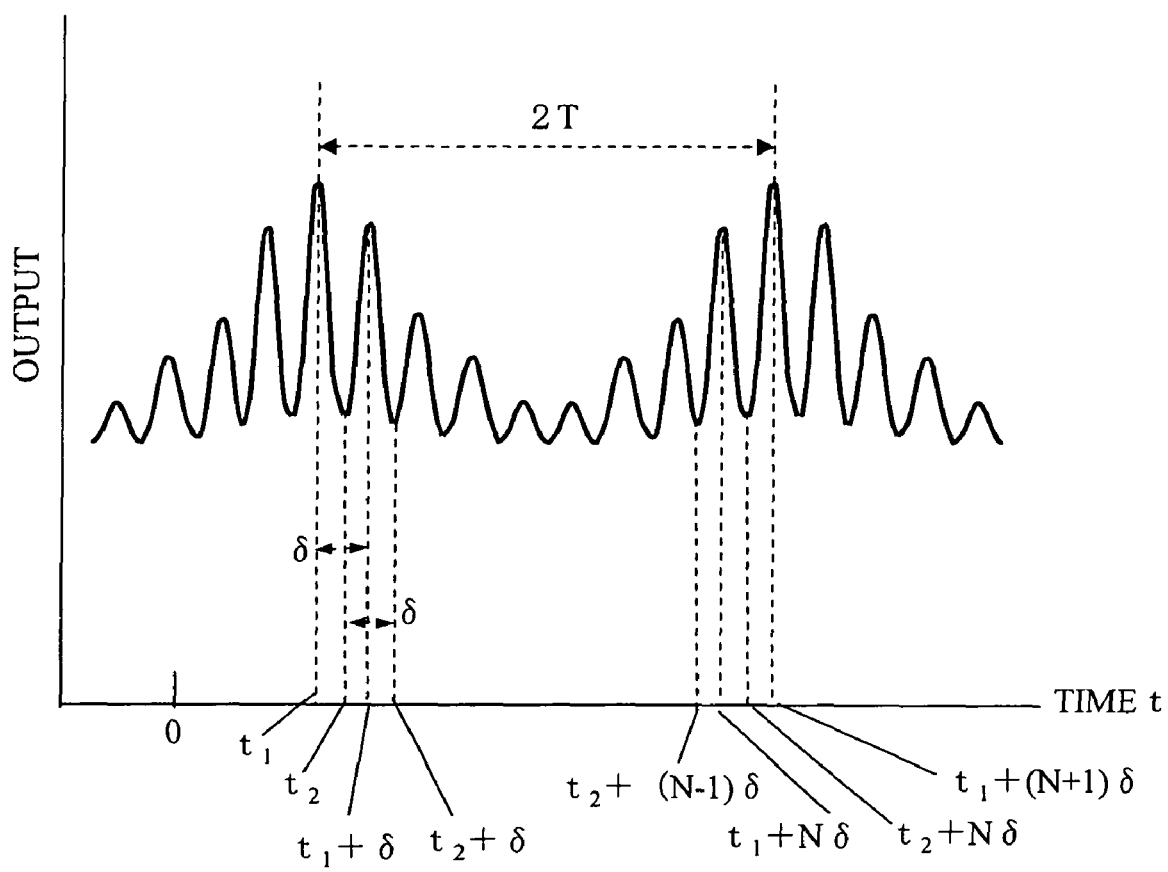
FIG. 4 shows a reproduction signal waveform during pulse irradiation.

FIG. 4 shows an example of a waveform obtained through pulse reproduction. An example where repetitive signals of 2T were reproduced is described herein. An arbitrary time is set to be zero, an arbitrary pulse light emission time is set to be $t_1$, and a bias light emission time is set to be $t_2$. The pulse light emission period and the sampling period are δ. Examples of the pulse light emission time are $t_1$, $t_1+δ$, $t_1+2δ$, . . . $t_1+Nδ$, $t_1+(N+1)δ$, and so on. Examples of the bias light emission time are $t_2$, $t_2+δ$, $t_2+2δ$, . . . $t_2+Nδ$, $t_2+(N+1)δ$, and so on. By sampling the output at each time, the reproduction signal during the pulse light emission and the bias light emission can be obtained.

FIG. 5A shows waveforms obtained during only the pulse light emission and during only the bias light emission. The waveform obtained from a reproduction signal during the pulse light emission and the waveform obtained from a reproduction signal during the bias light emission have a time lag of $\{(t_2+N\delta)-(t_1+N\delta)\}=(t_2-t_1)$. FIG. 5B shows waveforms of which the time lag was corrected after the individual reproduction signals were formed. FIG. 5C shows a waveform obtained from these two waveforms after the calculation:

(Reproduction Signal During Pulse Light Emission)—a (Reproduction Signal During Bias Light Emission).

As used herein, "a" refers to a constant. The constant a may be obtained such that the output shown in FIG. 5C becomes maximum, and it varies depending on the type of disk, the type of signal, and the relationship with recording marks and spaces disposed back and forth, for example.

Figure 5:
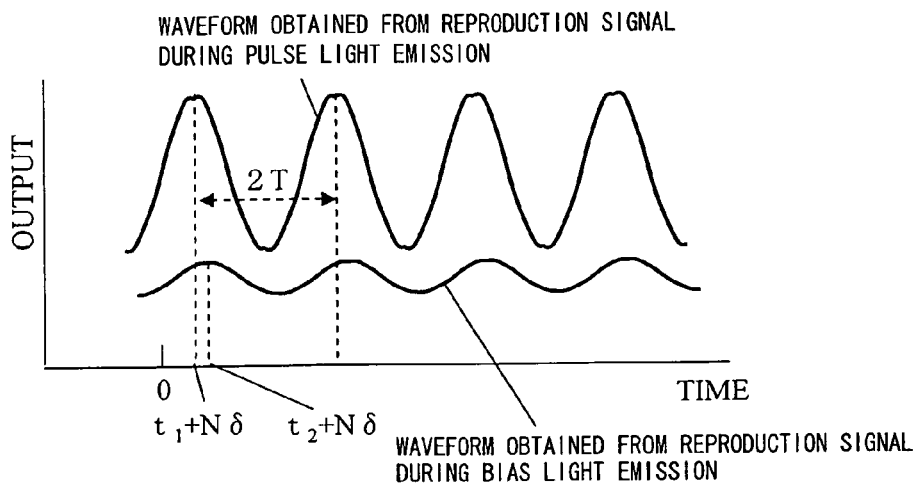
FIGS. 5A to 5C show diagrams for explaining an operation of time correction.
Figure 5:
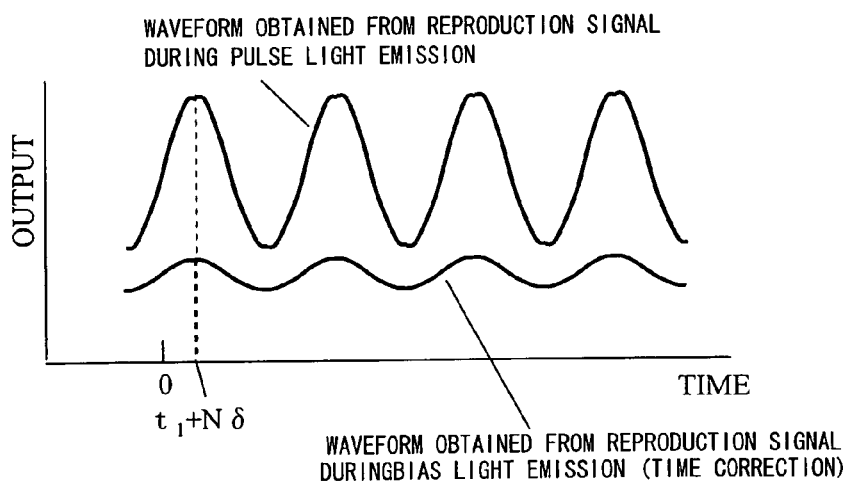
Figure 5:
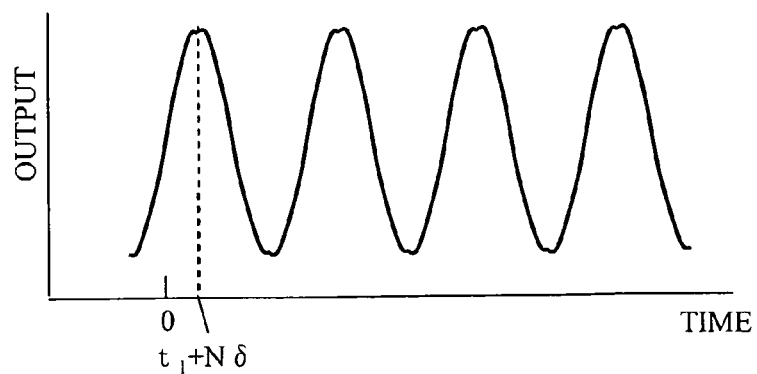
Figure 6:
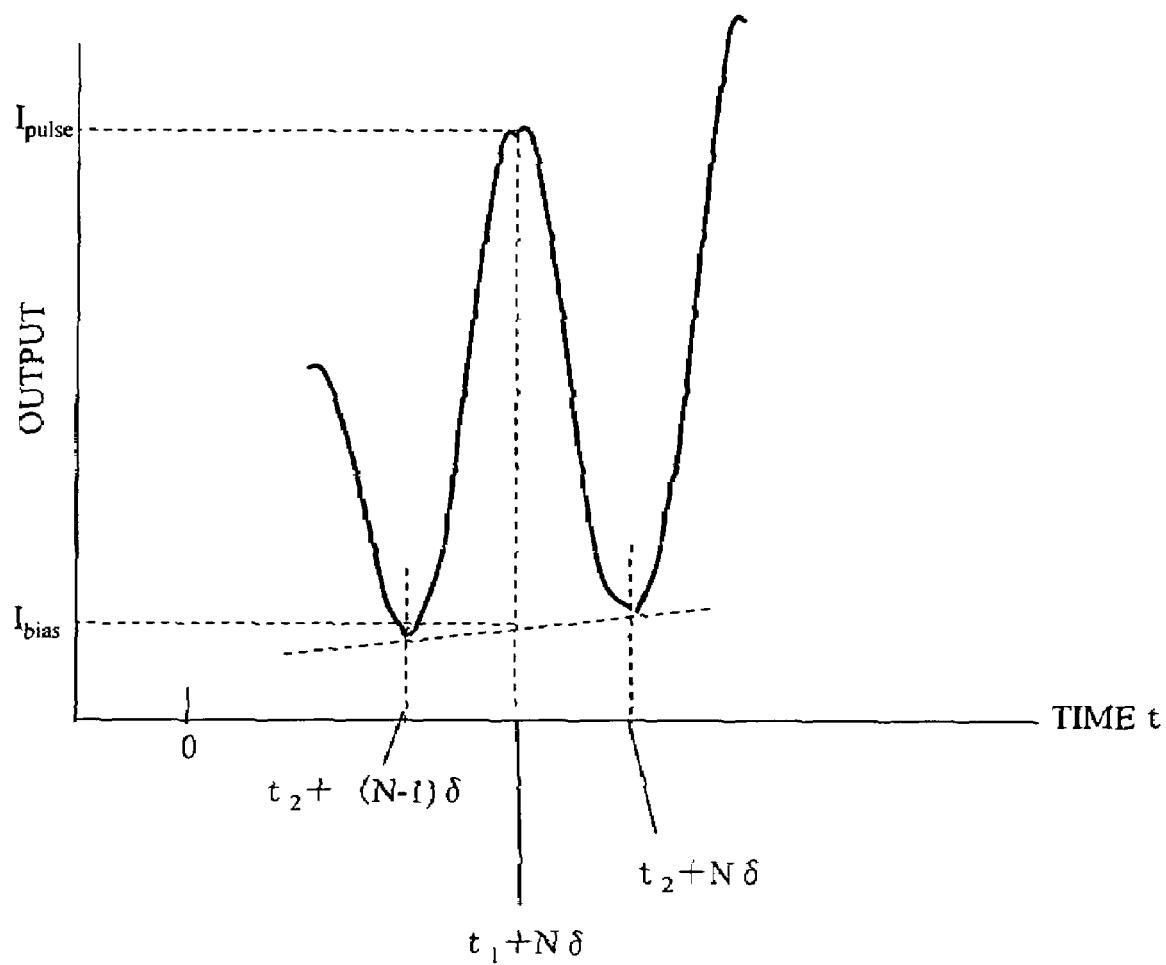
FIG. 6 shows a diagram for explaining an operation of time correction.
Figure 7:
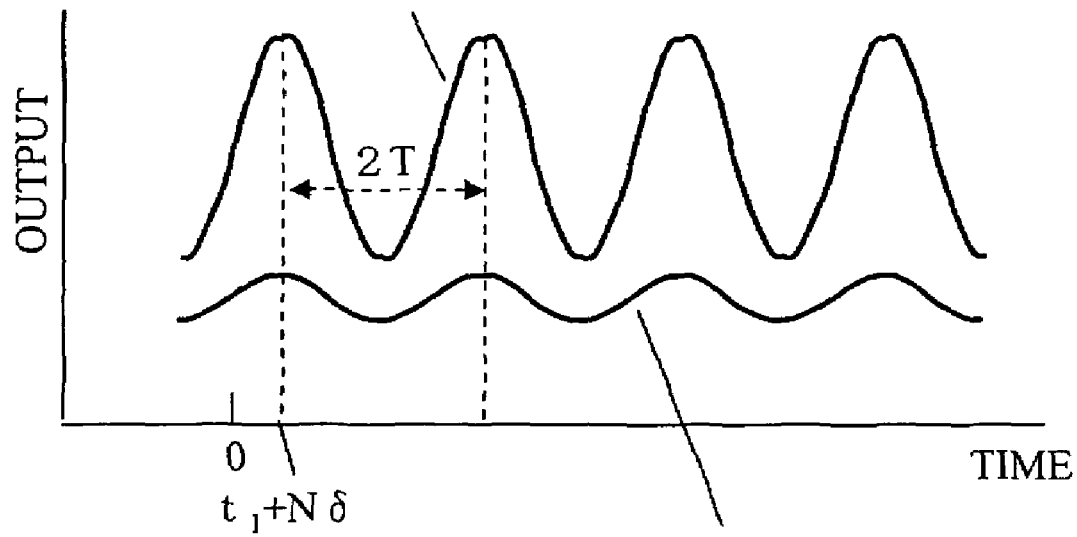
FIGS. 7A and 7B show diagrams for explaining the results of the operation of time correction.
Figure 7:
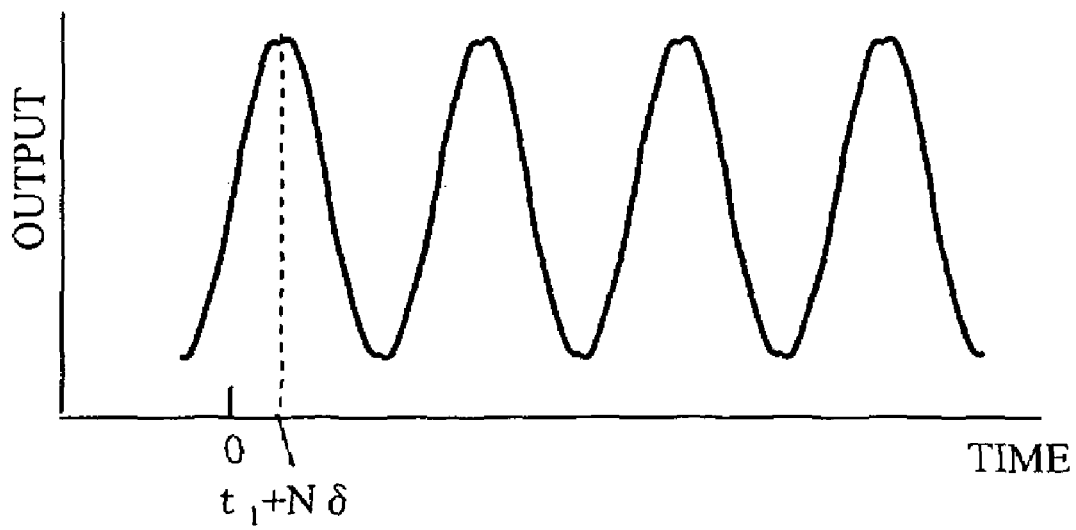

In accordance with the arithmetic method shown in FIG. 5, there may be cases where signals are inaccurate because the reproduction signal during the bias light emission is not obtained from the output obtained at the time $t_1+N\delta$ when forming the waveforms shown in FIG. 5B based on the waveforms shown in FIG. 5A. In such cases, an arithmetic processing shown in FIGS. 6 and 7 is carried out. FIG. 6 schematically shows reproduction signals in the vicinity of the reproduction signal during the pulse light emission at time $t_1+N\delta$. The reproduction signal during the bias light emission at time $t_1+N\delta$ can be obtained through interpolation using the reproduction signals during the bias light emission before and after the pulse light emission at time $t_1+N\delta$, namely, the reproduction signals during the bias light emission at time $t_2+N\delta$ and time $t_2+(N+1)\delta$. For example, a reproduction signal during the bias light emission at time $t_1+N\delta$ can be obtained by using an average value, a square mean value, or the like of the outputs during the bias light emission at time $t_2+N\delta$ and the output during the bias light emission at time $t_2+(N+1)\delta$.

FIG. 7A shows a waveform obtained from the reproduction signal during the bias light emission that is calculated as described above and a waveform obtained from the reproduction signal during the pulse light emission. Since a time lag correction has been conducted as described above, such time lag as shown in FIG. 5 is not present. FIG. 7B shows a waveform obtained from the two waveforms after the calculation:

(Reproduction Signal During Pulse Light Emission)—a (Reproduction Signal During Bias Light Emission).

As used herein, "a" refers to a constant. The constant a may be obtained such that the output shown in FIG. 7B becomes maximum, and it varies depending on the type of disk, the type of signal, and the relationship with recording marks and spaces disposed back and forth, for example.

As described above, the arithmetic processing is a processing for obtaining the difference between the reproduction signal from the pulse light emission portion and the signal from the bias light emission portion that is multiplied by a constant. Preferably, the processing is conducted after obtaining the reproduction signal of the bias light emission portion produced at the same point of time as the reproduction signal of an arbitrary pulse light emission portion through interpolation, using the reproduction signals of the bias light emission portions produced adjacent to the reproduction signal from the arbitrary pulse light emission portion in terms of time. While the above super-resolution layer is in the state of super-resolution at the pulse reproduction light emission portion, it is not in the state of super-resolution at the bias light emission portion.

Figure 8:
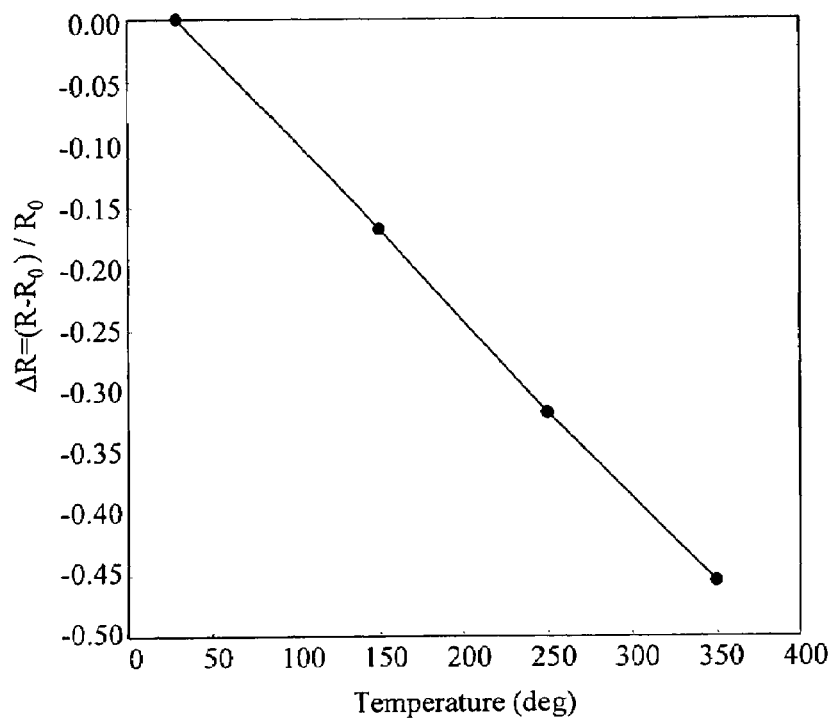
FIG. 8 shows the temperature dependency of the rate of change AR in reflectivity when a multilayer film having the same film structure as that of the manufactured ROM-type optical disk is heated.

As a preliminary study, a multilayer film having the same film structure as that shown in FIG. 2 was formed on a glass substrate, and change in reflectivity that accompanies an increase in temperature was obtained. FIG. 8 shows the temperature dependency of change $\Delta R$ in relative reflectivity of the multilayer film having the film structure of FIG. 2. The change $\Delta R$ in relative reflectivity was calculated based on equation (3), where R is reflectivity at each temperature and $R_0$ is reflectivity at 30° C. When the optical disk having the film structure of FIG. 2 was heated up to 350° C., reflectivity decreased as the temperature rose, and $\Delta R$ was −45.5%.

$$\Delta R = \frac{(R-R_0)}{R_0} \times 100(\%) \quad (3)$$

Figure 9:
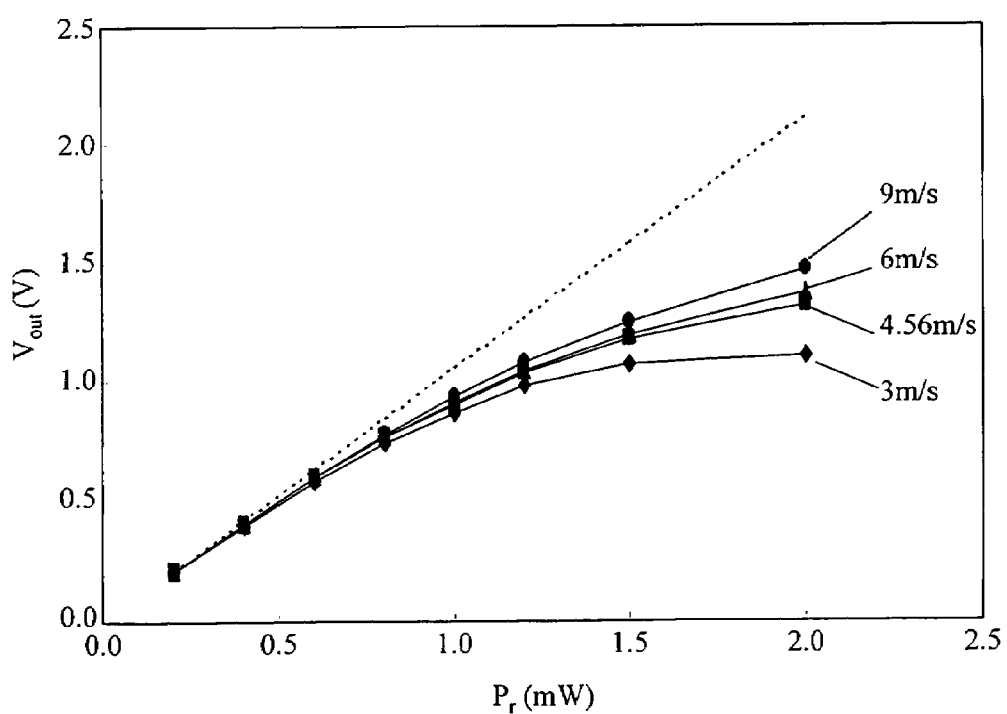
FIG. 9 shows the reproduction power dependency of a reflected light intensity ($V_{out}$) on a mirror surface of the manufactured ROM-type optical disk.

FIG. 9 shows the reproduction power (Pr) dependency of the reflected light intensity on the mirror surface of the optical disk having the film structure shown in FIG. 2. The reflected light intensity is shown as the output ($V_{out}$ (mV)) from a photodiode that is a photoreceiver. The measurement was carried out with the linear velocity of the disk rotation between 3 and 9 m/s.

In FIG. 9, the dotted line is a line, given that $V_{out}$ at each $P_r$ is proportional to $V_{out}$ when $P_r$=0.3 mW. It can be seen that, while $V_{out}$ is substantially linearly increased up until $P_r$ reaches approximately 0.7 m/W at any of the rotation velocities, $V_{out}$ is decreased with respect to the linear line when $P_r$ is 0.8 mW or more. Thus, it can be determined that an optical disk having such film structure is in the state of super-resolution when $P_r$=0.8 mW or more, and it is in the steady state when $P_r$ is less than 0.8 mW.

It can be seen that $V_{out}$ decreases as the rotation velocity decreases. Particularly, $V_{out}$ when $P_r$=2.0 mW at the rotation linear velocity of 3 m/s was about 50% of the value of the assumed line. It can be thought that the temperature of the optical disk surface increases since the amount of laser light irradiation per unit time increases as $P_r$ increases or the rotation linear velocity decreases. As shown in FIG. 8, the reflectivity of the optical disk having the film structure shown in FIG. 2 decreases as the temperature increases. Thus, it can be considered that reflectivity decreases as the temperature is increased by laser light irradiation.

Next, a ROM-type optical disk was manufactured, so as to examine a super-resolution effect based on pulse irradiation.

Figure 10:
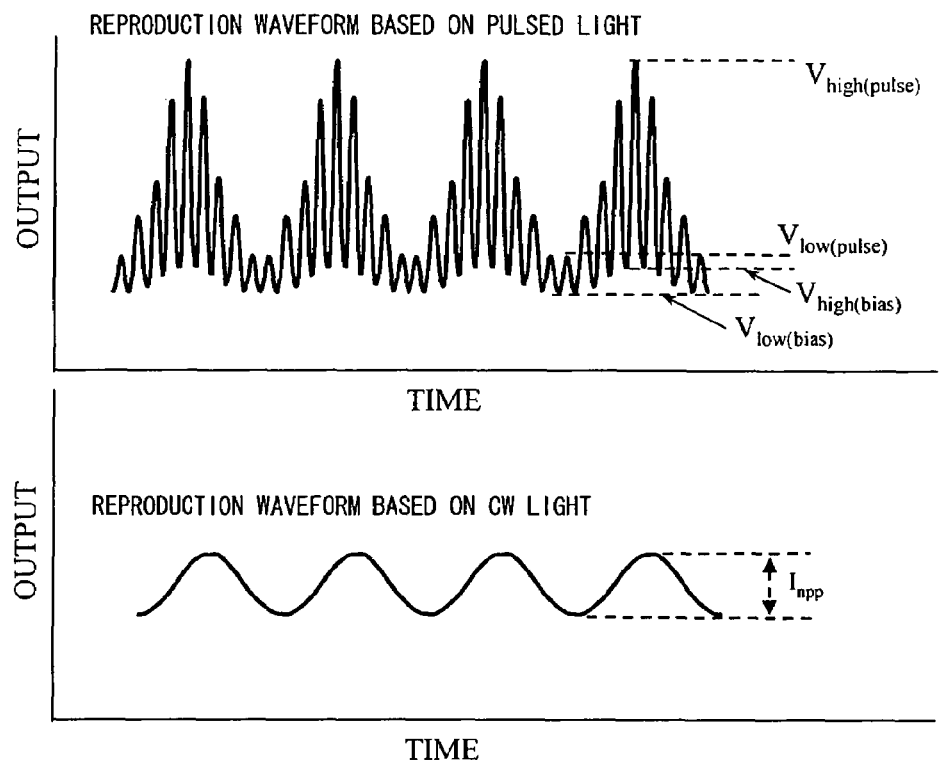
FIG. 10 shows reproduction patterns based on pulsed light and CW light.

FIG. 10 shows a diagram of reproduction signals when a single period mark having a mark length nT (n=2 to 8) was reproduced by the pulsed light and normal CW light (Continuous Wave). When an nT mark is reproduced by the pulsed light, the pulsed light is emitted to each of a mark and a space for multiple times as they are passed by. On the other hand, in the case of reproduction by the normal CW light, the output continuously varies in accordance with change in reflectivity of the mark and the space.

As shown in FIG. 10, in the pulse reproduction method, an amplitude $I_{npp}$ was defined as the following equation (4):

$$I_{npp}=(V_{high(pulse)}-V_{high(bias)})-a(V_{low(pulse)}-V_{low(bias)}) \quad (4)$$

where the low and high levels of the pulse light emission portion are $V_{low(pulse)}$ and $V_{high(pulse)}$, respectively, and the low and high levels of the bias light emission portion, which do not involve pulse irradiation, are $V_{low(bias)}$ and $V_{high(bias)}$, respectively.

Figure 11:
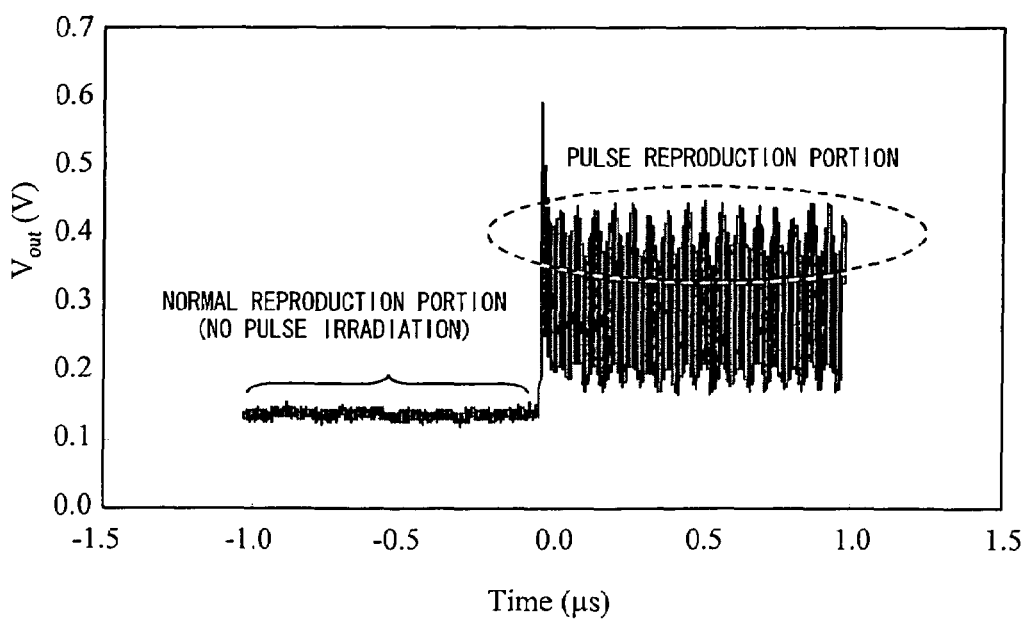
FIG. 11 shows raw data about reproduction outputs of a normal reproduction portion and a pulse reproduction portion.

FIG. 11 shows an rf signal waveform of the 2T mark measured by using the pulse reproduction method. The horizontal axis shows time and the vertical axis shows the output ($V_{out}$). Pulse light irradiation starts at time 0, and a reproduction waveform based on CW light is shown before time 0. A peak power $P_w$ of the pulse light was set to be 8 mW, and a base power $P_b$ and a reproduction power $P_r$ based on CW light were set to be 0.8 mW. Under these conditions, the reproduction amplitude of the 2T mark was barely observed in the reproduction signal based on CW light. However, the signal amplitude of the 2T mark was clearly observed in the pulse reproduction portion. Thus, it can be considered that the super-resolution layer of $Fe_2O_3$—$Ga_2O_3$ was strongly excited due to pulse light irradiation and caused to be in the state of super-resolution, whereby resolution was improved. Since the duration of pulse light emission was approximately 3 ns, the response speed of the super-resolution layer of $Fe_2O_3$—$Ga_2O_3$ was 3 ns or lower. Thus, it can be seen that change in refractive index follows the rising of pulse light.

Figure 12:
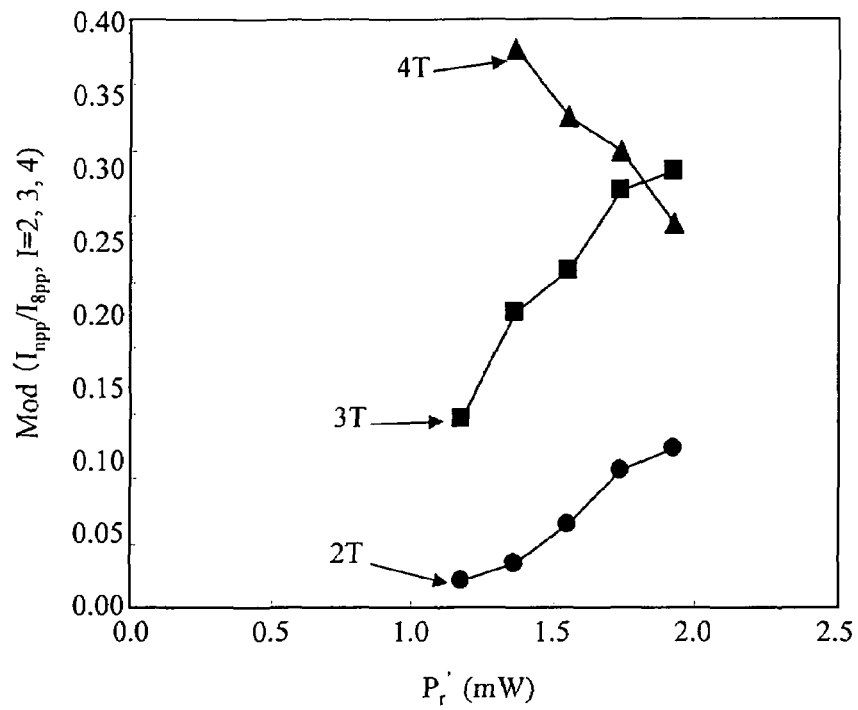
FIG. 12 shows change in resolution of 2T, 3T, and 4T marks with respect to $P_r$'.

A similar evaluation was conducted on 3T and 4T marks. FIG. 12 shows an effective reproduction power $P_r'$ dependency of the resolution obtained from the pulse reproduction waveforms of individual 2T, 3T, and 4T marks. The constant a shown in equation (4) was obtained for each of the 2T, 3T, and 4T marks, and the resolution was maximum when the constant was 1.52 in the case of 2T, 1.36 in the case of 3T, and 1.27 in the case of 4T. In the following evaluation, an example where calculation was conducted using such values as the constant in equation (4) is described.

In the 2T mark, the resolution when $P_r'=2.0$ mW was about 5.8 times greater than the resolution when $P_r'=1.4$ mW, and therefore, the resolution was significantly improved compared to the reproduction waveform based on CW light. Similarly, with regard to the 3T mark, the resolution was improved as much as 2.5 times. The resolution of the 2T mark when $P_r'=2.0$ mW was approximately the same as that of the 3T mark when $P_r'=1.2$ mW. Based on such findings, it can be said that the resolution in a linear density direction was improved about 1.5 times.

Figure 13:
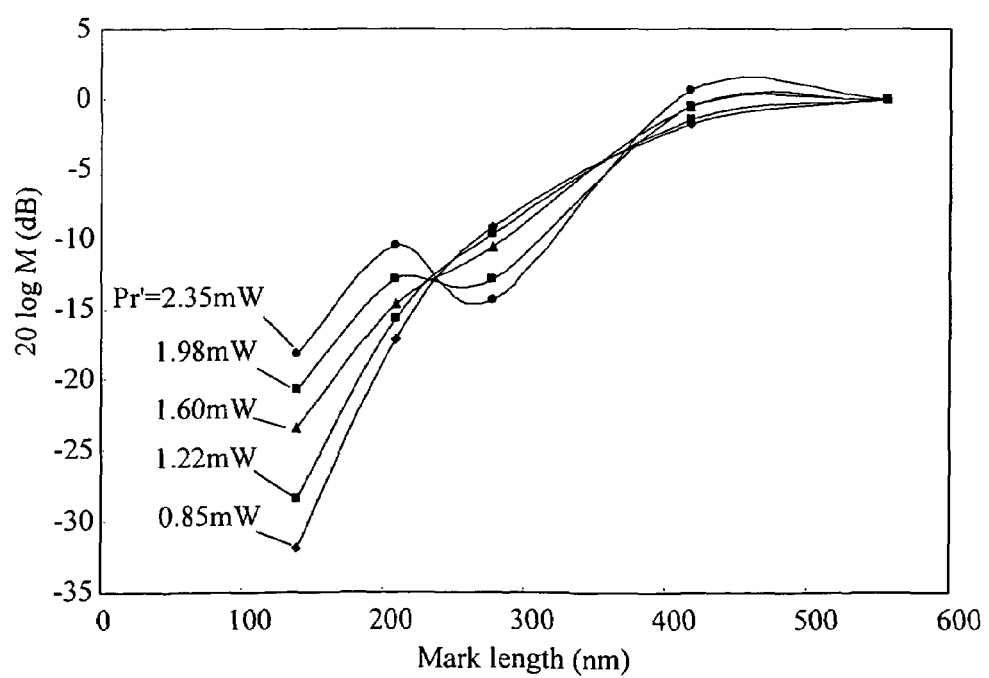
FIG. 13 shows a diagram in which the logarithm of resolution is plotted with respect to each mark length (T).

On the contrary, the resolution of the 4T mark decreased as $P_r'$ increased. For clarifying the phenomenon, the resolutions with respect to individual mark lengths (Ts) were plotted. FIG. 13 shows the results. In FIG. 13, the vertical axis shows the logarithm (dB) of resolution, and the horizontal axis shows mark lengths. For a lower $P_r'$, the resolution steadily decreased as the mark length decreased. However, as $P_r'$ increased, the degree of modulation increased in regions where the mark length is 243 nm or shorter, and particularly, an increase in resolution near 139 nm that corresponds to the 2T mark was very significant. On the other hand, it can be seen that there are regions where the resolution decreases as $P_r'$ increases in regions between the mark length 243 nm and 380 nm.

Figure 14:
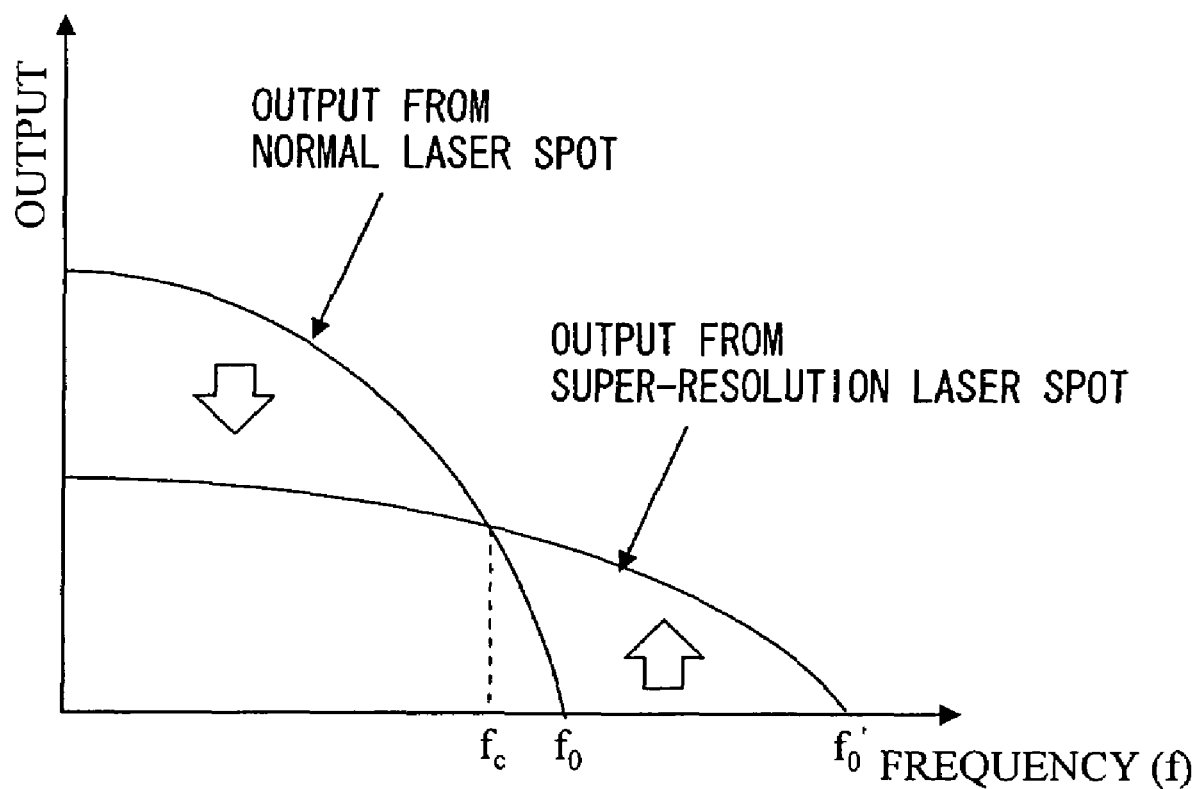
FIG. 14 shows a diagram of the frequency dependence of reproduction signal intensity in the state of super-resolution.

A beam spot obtained due to a super-resolution effect can be obtained by the sum of a normal laser spot that is not in the state of super-resolution and a laser spot that is in the state of super-resolution. FIG. 14 shows a diagram of the frequency dependence of reproduction signal intensities obtained by these beams. While the reproduction output of the laser spot in the state of super-resolution is smaller than that of a normal laser beam, since the spot diameter thereof is reduced, the resolution is improved and the output is high at higher frequencies. Thus, the cutoff frequency increases from fo to fo'. In a front aperture method, since a mask is formed as reflectivity decreases, the polarity of the read-out signal in the state of super-resolution is negative assuming that in the state of normal resolution is positive. Thus, in the state of super-resolution, an output at lower frequencies decreases compared to the output in the case of normal reproduction.

In contrast, at higher frequencies, the output from the normal laser beam is zero at frequencies higher than the cutoff frequency fo. However, since the output from the super-resolution spot is significant, the output is improved. It can be considered that the boundary between the decrease in output at lower frequencies and the increase in output at higher frequencies is fc.

Based on the experimental results shown in FIG. 13, the mark length that corresponds to this fc is 243 nm, which size is approximately equal to one half of the diameter of the laser beam spot. It can be assumed that, when the size of a mark is one half or greater than the diameter of the laser spot, since a signal can be separated even with a normal spot diameter that does not have the super-resolution effect, a decrease in the amount of reflected light becomes significant due to a laser spot reduced by the super-resolution phenomenon, thereby reducing the resolution. On the other hand, when a mark size is smaller than one half of the normal spot diameter, two or more marks are contained in the spot. Thus, while the resolution decreases, since the super-resolution effect causes the laser spot size to be smaller and two marks or less are contained in the spot, the resolution can be improved.

Figure 15:
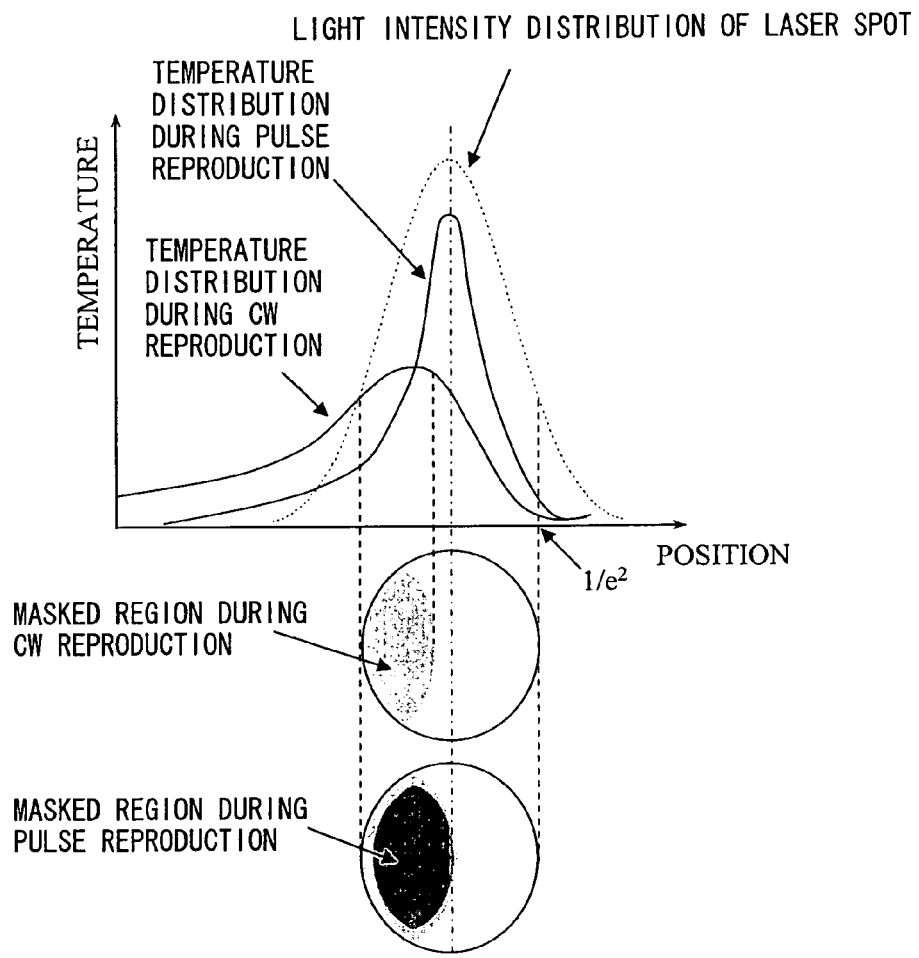
FIG. 15 shows a schematic diagram of temperature profiles on the disk film surface when reproduction was performed on the optical disk having a super-resolution effect using CW light, and pulse light and optical masks formed then.

Next, the reason why such reproduction method using pulse reproduction provides a higher super-resolution effect than CW reproduction will be described. FIG. 15 shows a diagram of temperature profiles on the disk film surface when reproduction was carried out with an optical disk having the super-resolution effect via CW light and pulse light, and optical masks formed then. With regard to the temperature profiles shown in the top portion of FIG. 15, the horizontal axis shows the position in a disk circumferential direction, and the vertical axis shows the temperature on the film surface. The laser spot transfers from the negative side to the positive side of the diagram. As shown in the figure, an arbitrary time cross section shows that the light intensity distribution of the laser spot is a Gaussian distribution having its center on position ro. The bottom portion of FIG. 15 shows diagrams of the optical masks at the positions that correspond to the temperature profiles. In this figure, a case where reflectivity decreases as the temperature rises is shown. Since the illustrated example in the figure has a mask shape, wherein the backside of the laser beam is masked and the window on the front side is open, it is referred to as "front aperture method." In the case of CW light irradiation, since the laser spot is transferred from the negative direction to the positive direction of the position, the temperature of the film surface increases due to the continuous laser light irradiation during the transfer, and the surface is cooled as the laser light intensity decreases. Thus, the temperature distribution is skewed to the negative side. In accordance with this temperature distribution, the optical constant of the super-resolution film varies, and a region of the laser spot on the negative side is masked as reflectivity decreases, thereby reducing the effective laser spot diameter.

On the other hand, in the case of pulse laser light irradiation, if the light emission period of pulse light is sufficiently long compared with the pulse transfer time, because a continuous laser light irradiation is not involved, the skew of the temperature distribution to the negative side is significantly reduced compared with the case where CW light is used, and a temperature profile that is close to the Gaussian distribution can be obtained. Further, since the laser light irradiation is conducted for a short time, less thermal damage is caused to a sample, and the peak intensity of the laser light can be made larger. Thus, a local temperature at a pulse peak position can be made higher. Generally, with regard to a super-resolution material, since the amount of change in optical constant becomes greater as the temperature rises, it can be considered that a larger change in reflectivity is brought about, compared with that during CW reproduction. Thus, it can be considered that the reflectivity at the produced mask portion can be reduced, and a super-resolution laser spot with higher contrast can be formed.

While the above example was performed with the arithmetic method shown in FIG. 5, a high super-resolution effect similar to the one shown in FIG. 5 was obtained when an arithmetic processing was performed using the method shown in FIGS. 6 and 7.

EXAMPLE 2

Pulse reproduction will be reviewed from the viewpoint of signal response characteristics. FIG. 8 shows a diagram in which reflectivity R is a function of temperature T and the temperature dependence of a change $\Delta R$ in reflectivity is normalized by reflectivity Ro (30° C.) at 30° C. Reflectivity R(T) at temperature T can be expressed using the following equation with the change $\Delta R$ (T) in reflectivity:

$$R(T)=Ro(30° C.)\cdot(1+\Delta R(T)) \quad (5)$$

Temperature T on a disk surface varies depending on a point (x, y) on the disk because it is irradiated with an optical spot, and therefore, reflectivity varies at each point (x, y) on the disk surface. When a disk having reflectivity R (x, y, T) is irradiated with a spot distribution S (x, y), its reflective spot distribution I (x, y) becomes a function of temperature as shown in the following equation:

$$I(x, y, T)=S(x, y)\cdot R(x, y, T) \quad (6)$$

Figure 16:
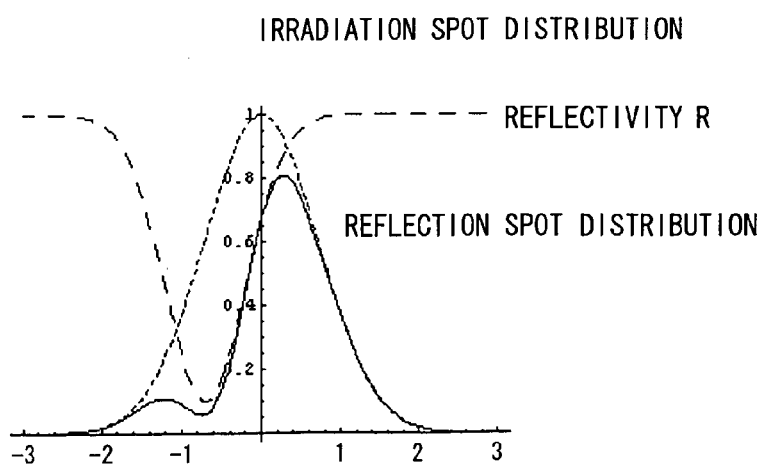
FIG. 16 shows an operation model of super-resolution.
Figure 18:
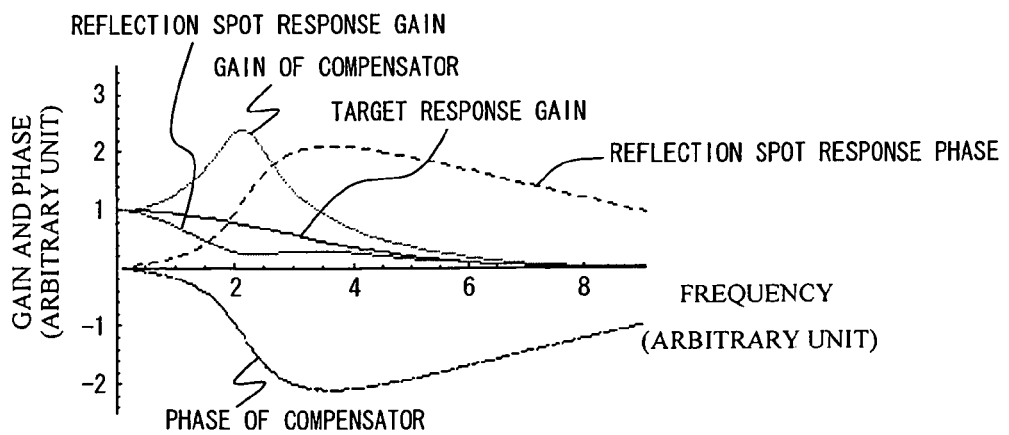
FIG. 18 shows response characteristics of the super-resolution disk and characteristics of a compensator.

It can be assumed that the reflectivity is equal to Ro near the temperature 30 degrees, irrespective of the spot on the disk. However, when the spot is irradiated with high power, the temperature on the disk surface increases, varying the temperature distribution at individual points. FIG. 18 shows these relationships with a one-dimensional coordinate in the spot traveling direction. The reflectivity R decreases as the temperature rises, and the temperature distribution is shifted in a direction in which it is lagged behind the irradiation spot. Thus, reflectivity characteristics become such as shown in FIG. 16. While an irradiation spot distribution S has a distribution indicated by the dotted line, a reflection spot distribution I becomes such as indicated by the solid line if S and R are multiplied as in the figure. The reflection spot scans a ROM pattern manufactured on the disk surface and reproduction signals are detected.

Figure 17:
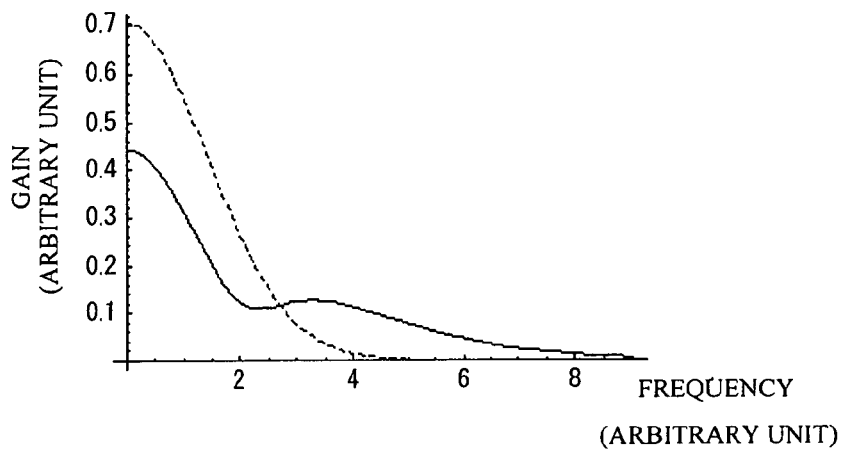
FIGS. 17A and 17B show response characteristics of a super-resolution disk.
Figure 17:
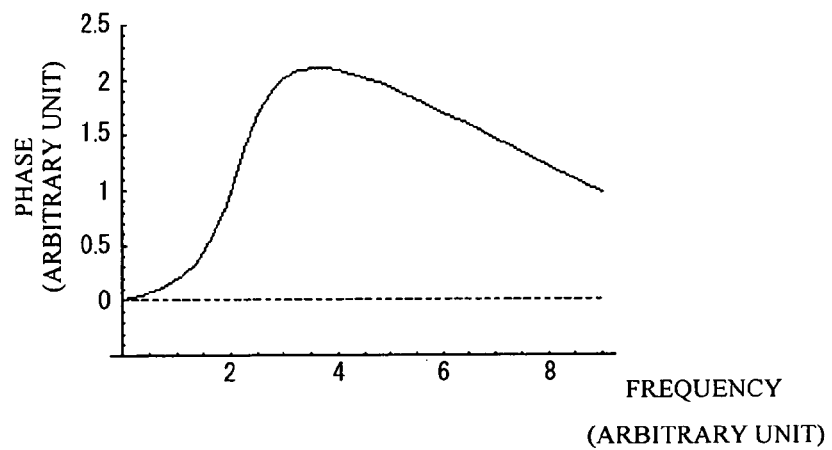

It is know that a response of the reproduction signal at this point can be obtained by a convolution of the reflection spot distribution and the ROM pattern, and the response of the reproduction signal can be predicted by obtaining the impulse response of the spot. The impulse response of the spot can be obtained by performing Fourier transform of the reflection spot distribution. FIGS. 17A and 17B show the results. FIG. 17A shows a gain characteristic and FIG. 17B shows a phase characteristic. The dotted line shows the impulse response of the irradiation spot. The impulse response of super-resolution has the characteristics that, while the response band widens, the gain decreases and the phase changes in midrange frequencies, and the gain decrease in lower frequencies. Thus, it greatly differs from a general irradiation spot response characteristics, making its application difficult.

It is conceivable to correct the response characteristics of super-resolution by utilizing the characteristics during the recess of pulse of pulse reproduction, as described in Example 1. However, another solution will be proposed hereafter. The following is an equation, where $Gs(\omega)$ is the impulse response of super-resolution, $Gopt(\omega)$ is a desired impulse response, and $H(\omega)$ is the response to be corrected.

$$Gopt(\omega)=Gs(\omega)\cdot H(\omega) \quad (7)$$

It is expected that the frequency band due to super-resolution can be improved approximately 1.5 to 2 times greater since the effective spot size during a normal recording is about one half of the irradiation spot. Assuming that the response band for $Gopt(\omega)$ is 1.5 times greater, $H(\omega)$ becomes such as shown in FIG. 18. While the gain of $H(\omega)$ becomes large in midrange frequencies, an overall response characteristics can be 1.5 times greater through correction.

EXAMPLE 3

In the foregoing example, the response characteristics of super-resolution were improved with pulse reproduction signals alone. However, since the gain becomes large at midrange frequencies, it can be assumed that noise may increase at midrange frequencies and an overall signal-to-noise ratio may decrease. Thus, another example for correction using normal reproduction signals will be proposed. In FIG. 16, given that G(x, y) is the distribution of the increased temperature region on the super-resolution film, equation (8) can be derived, and reflection spot distribution I(x, y) can be expressed by equation (9).

$$R(x, y) = Ro \cdot (1 - G(x, y)) \quad (8)$$

$$\begin{aligned} I(x, y) &= S(x, y) \cdot Ro \cdot (1 - G(x, y)) \\ &= Ro \cdot (S(x, y) - S(x, y) \cdot G(x, y)) \end{aligned} \quad (9)$$

In a current optical disk signal processing, a reproduction signal is deemed as a superposition of responses determined by an optical spot and a unit mark, and partial response or maximum likelihood detection is carried out. Thus, it is preferable to optimize the responses of the spot and the unit mark. In equation (9), because S(x, y) exists as an extra distribution, if the response of S(x, y) and the unit mark is removed, the responses of remaining spot distributions and the unit marks alone will be present. Thus, it becomes only necessary to correct the responses such that they become desired responses.

Figure 19:
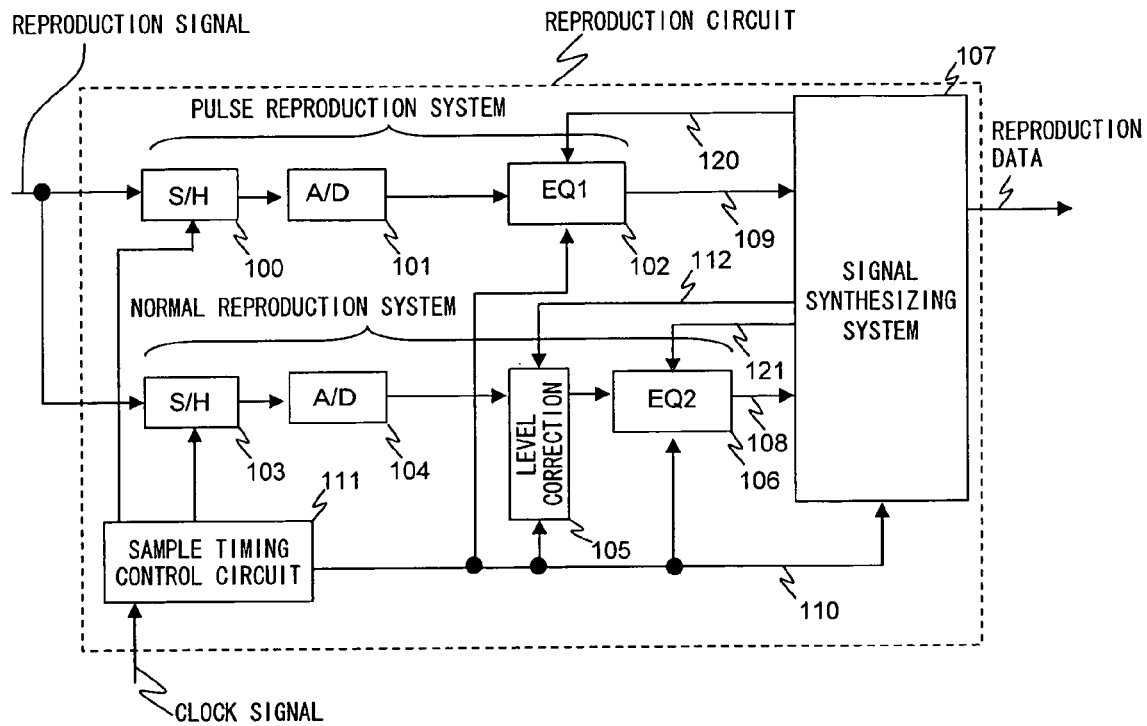
FIG. 19 shows a block diagram of a reproduction circuit.

FIG. 19 shows a specific reproduction circuit block. In FIG. 1, while the circuits after the sampling circuits 16 and 17 were described when a conventional analog processing is used, a case where a digital processing that is mainly used at the moment will be described hereafter. FIG. 19 shows a block 205 that corresponds to the circuits 16 to 22 shown in FIG. 1. A pulsed light reproduction signal in accordance with the clock generated from the clock generating circuit 99 shown in FIG. 1 is inputted to sample hold circuits 100 and 103. The individual outputs from the sample hold circuits 100 and 103 are inputted to AD converter circuits 101 and 104. At this point, the pulse reproduction signal level is larger than that of the normal reproduction, as shown in FIG. 6. Thus, it is difficult to convert the pulse reproduction signal and the normal reproduction signal with AD converters having the same fixed bit number. While conversion is possible with a floating bit number type, it becomes expensive. Consequently, AD converters for each of the pulse reproduction signal and the normal reproduction signal are provided, such that a dynamic range is allowed to be effectively used for the individual signals, and influence of quantization noise is reduced.

The output from the AD converter 104 is inputted to a level correction circuit 105, so as to correct an error between the two signals, the error being based on the difference between the pulse reproduction timing and the normal reproducing timing. Specifically, a normal reproduction signal level at the timing of the pulse reproduction signal is obtained through interpolation, using normal reproduction signals at two timings. In addition to that, the amplitudes of the pulse reproduction signal and the normal reproduction signal are corrected. A signal for controlling the correction of the amplitudes is output ted from a signal synthesizing circuit 107 to be described later.

The output of the level correction circuit 105 is inputted to an equalizing circuit 106, and the output of the equalizing circuit 106 is inputted to the signal synthesizing circuit 107. Meanwhile, the output from the AD converter 101 is inputted to an equalizing circuit 102, and the output of the equalizing circuit 102 is inputted to the signal synthesizing circuit 107. The signals that have been individually processed in the pulse reproduction system and the normal reproduction system are inputted to the signal synthesizing circuit 107, and an overall signal processing is performed therein. Reproduction data is then detected.

Figure 20:
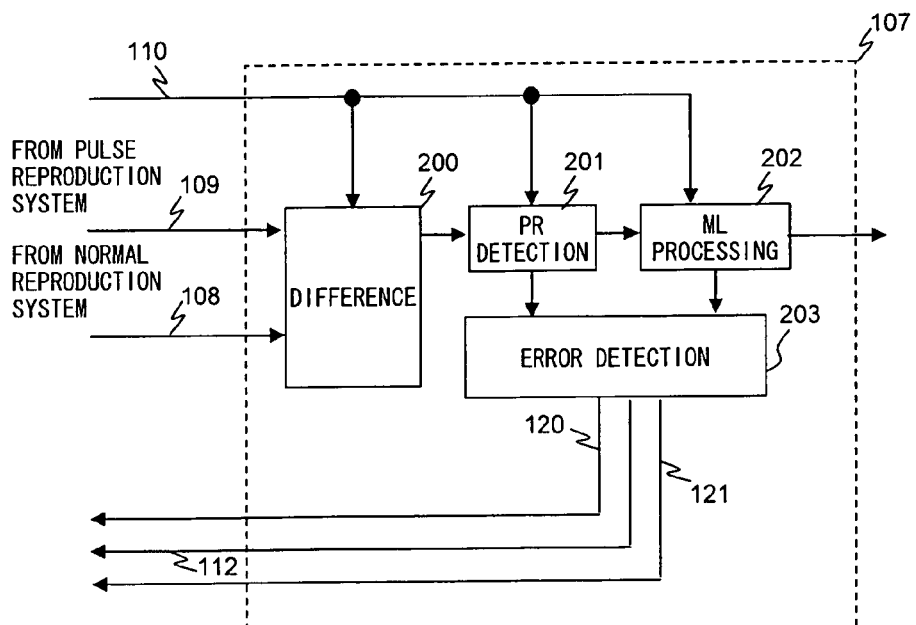
FIG. 20 shows a block diagram of a reproduction circuit.

Next, the structure of the signal synthesizing circuit 107 will be described with reference to FIG. 20. An equalized signal 109 of the pulse reproduction system and an equalized signal 108 of the normal reproduction system are inputted to a differential circuit 200 in which the difference is processed. The output of the differential circuit 200 is inputted to a PR detection circuit 201 in which the level of the reproduction signal multi-valued via partial response is determined by using a timing of a clock 110, and the level determined is transmitted to an ML processing circuit 202 in which a maximum likelihood is determined. The most likely data is then detected as reproduction data.

How the signal is processed will be described with reference to FIG. 21. A mark string shown in the figure is recorded on a track center 306. A waveform 303 is a waveform generated from the mark string when read via a normal reproduction spot 301, and a waveform 304 is a waveform generated when read via a spot 302 involving the super-resolution effect alone. However, in the present example, since a mark is read via a mixed spot consisting of the normal spot 301 and the spot 302 involving the super-resolution effect alone even during the super-resolution reproduction, the reproduction waveform is a waveform 305. As described above, the waveform 304 can be obtained by performing an arithmetic processing on the waveform 303 with respect to the waveform 305.

Error information is transmitted from the PR detection circuit 201 and the ML processing circuit 202 to an error detection circuit 203. For example, the error detection circuit 203 is notified of a greater frequency of occurrence of a reproduction signal level near a multilevel threshold from the PR detection circuit 201. Further, it is notified of a larger separation between a target path and a reproduction signal path from the ML processing circuit 202.

Since a main cause for the error information from the ML processing circuit 202 is based on deviation in response characteristics in the overall system, the equalization constant of the equalizing circuit 102 that has a direct relation with an overall system response is varied via a control signal 120, so as to reduce the occurrence of errors in the ML processing circuit 202. Since a main cause for error information from the PR detection circuit 201 is based on an unadjusted gain in the normal reproduction system, a control signal 122 for controlling the correction level of the level correction circuit 105 is transmitted from the error detection circuit 203, and the normal reproduction response is removed from the pulse reproduction response, so as to reduce the occurrence of errors in the PR detection circuit 201. Further, since the error information from the PR detection circuit 201 also occurs due to an unadjusted equalization constant of the normal reproduction system, if the error cannot be reduced by the above gain adjustment, the equalization constant of the equalizing circuit 106 is varied by a control signal 121, so as to reduce the occurrence of errors in the PR detection circuit 201.

EXAMPLE 4

Sampling for reading has been conducted by using a signal from the clock generating circuit 99 in the disk drive. It is necessary that the sampling frequency is at least two times, preferably approximately five times, greater than the data frequency. However, if the data transfer rate from the disk is increased, the sampling frequency also increases, whereby circuit electrical characteristics may fail to follow. Thus, it is desirable to carry out sampling at a frequency near the signal band in synchronization with the signal. In cases where a partial response is applied to signal detection as described in example 3, commonly, the sampling frequency is such that sampling is performed in synchronization with the signal at a cycle period of detection window width Tw.

Consequently, it becomes necessary to generate a sample clock in synchronization with a signal. In the present example, a clock is generated from a mark that can be reproduced by the normal reproduction, and the super-resolution reproduction is also performed with such clock. For this, a signal that is resoluble during the normal reproduction is previously provided for use.

Figure 21:
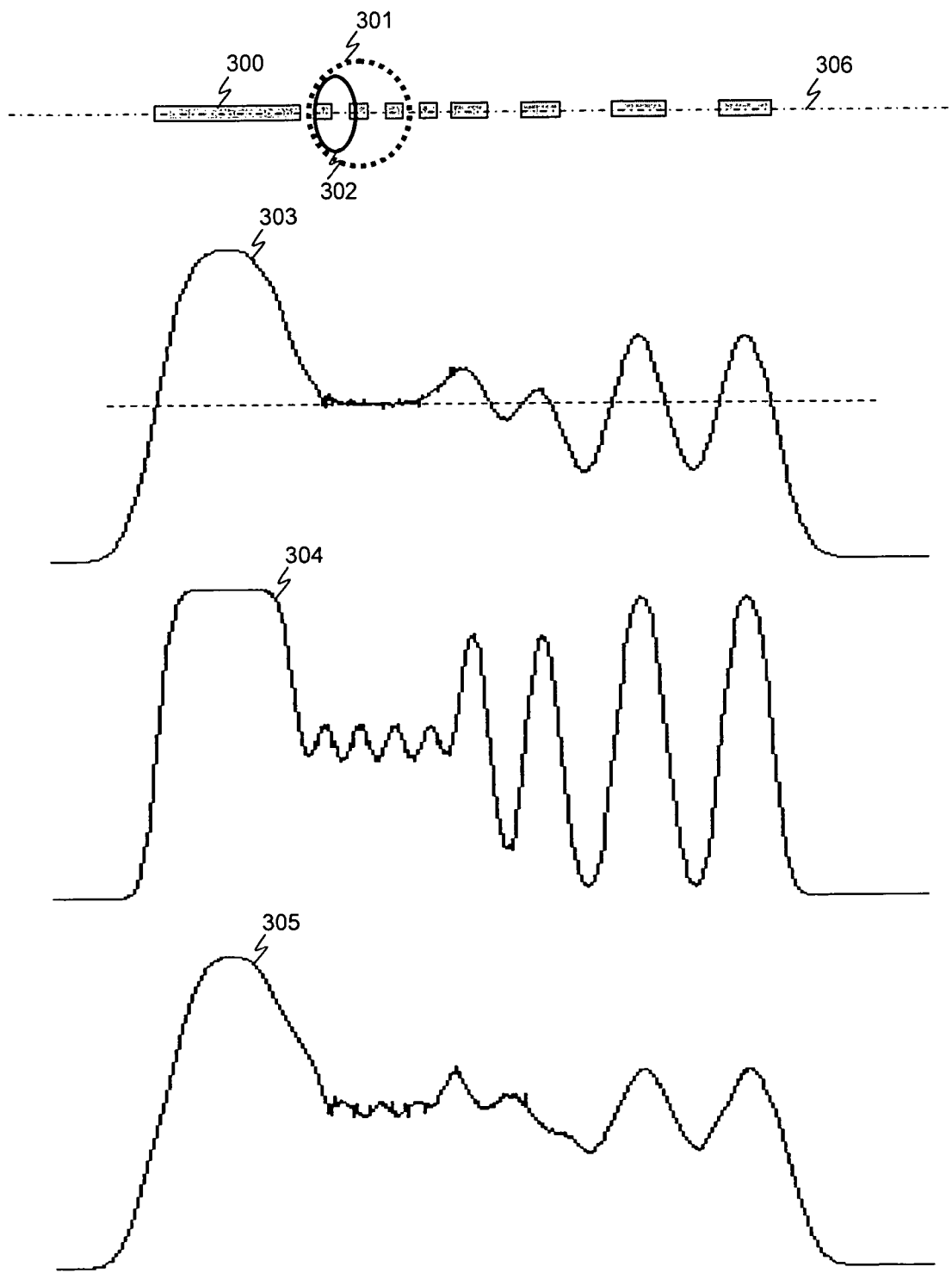
FIG. 21 shows diagrams for explaining a signal processing.

The waveform 303 indicates that a mark 300 among the mark string shown in FIG. 21 can be adequately read by the normal reproduction spot 301. In a conventional optical disk signal, as such a mark, a synchronous mark is used for a synchronizing signal. For example, in DVDs, as the synchronous mark, there is provided a long mark having a length of 14 Tw that does not appear in a modulation code if the width of a detection window is set to be Tw, and synchronization is conducted by detecting such mark. While synchronization can be conducted by using such synchronous mark signal, a clock signal as described below can also be generated via a signal string having sufficient resolution during the normal reproduction.

Figure 22:
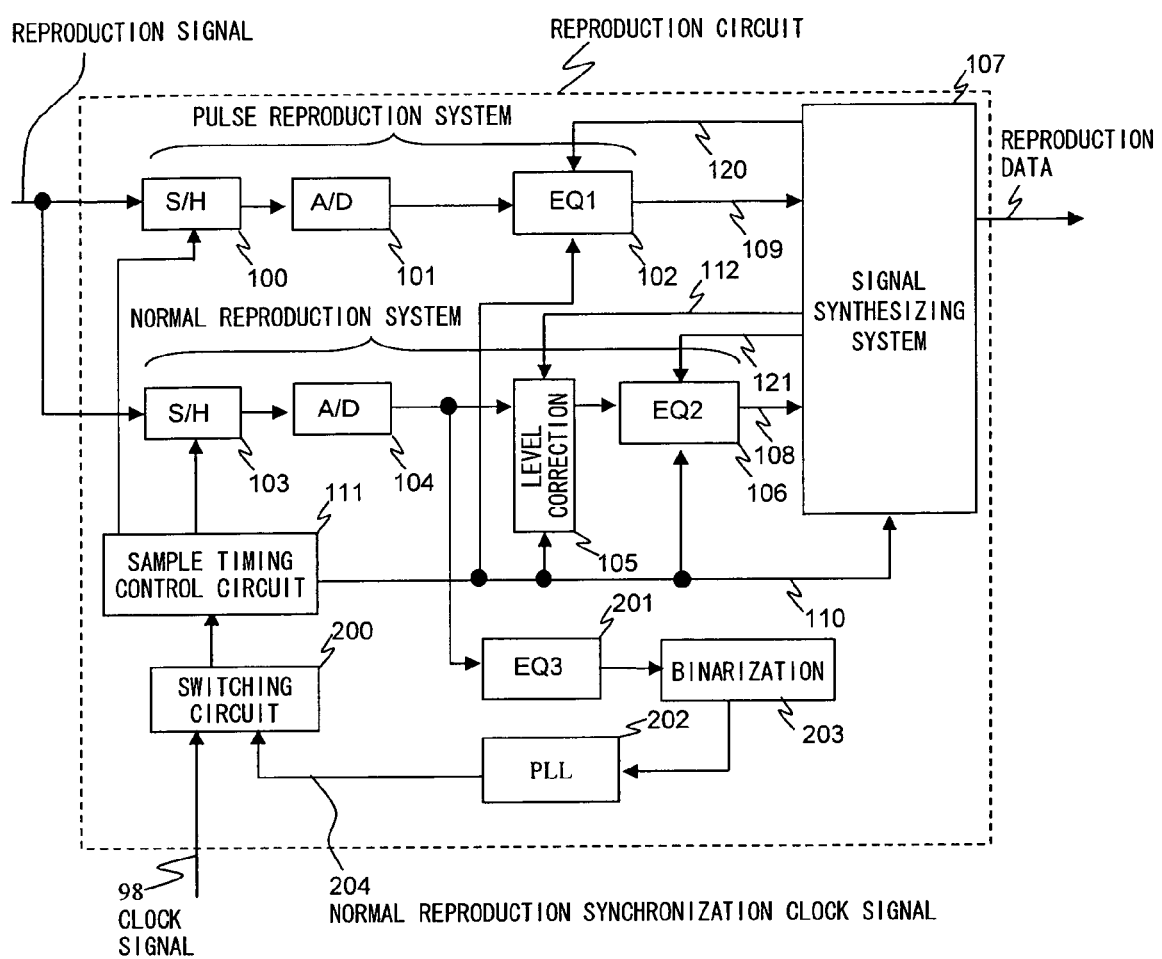
FIG. 22 shows a block diagram of a reproduction circuit.

In the following, the operation of reproduction will be described with reference to FIG. 22. Recorded information is reproduced by using the normal reproduction spot 301 with a low laser output so that super-resolution does not occur. The signal is converted via an AD converter 104, so as to obtain the waveform 303. A suitable equalization is performed on the normal reproduction spot via an equalizer 201 and inputted to a binarization circuit 203. After binarization, a clock signal 204 that is in synchronization with the normal reproduction signal is generated from PLL circuit 202 and it is inputted to a sample timing control circuit 111 via a switching circuit 200 for switching the clock signal 98 used in other examples and the clock in the present example. If the clock signal 98 used in other examples is not used, the switching circuit 200 is omitted, and the clock signal 204 that is in synchronization with the normal reproduction signal is directly inputted to the sample timing control circuit 111.

While the foregoing examples have been described with examples where a medium whose reflectivity decreases when the super-resolution effect is involved is used, the present invention is not limited thereto. A medium whose reflectivity increases due to the super-resolution effect may be also used. It goes without saying that it is necessary to change the signal polarity in such case.

EXAMPLE 5

Figure 23:
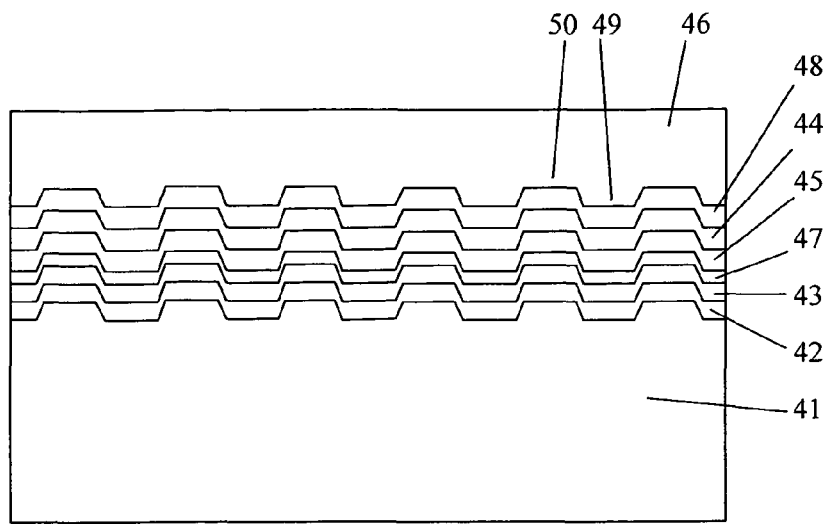
FIG. 23 schematically shows a cross-sectional view of a manufactured recording-type optical information recording medium.

Next, a similar examination was also conducted on a recording-type disk. FIG. 23 shows a cross-sectional view of a manufactured recording-type optical information recording medium. In FIG. 23, numeral 41 denotes a substrate, numeral 42 denotes a reflective layer, numerals 43, 45, and 48 denote protective layers, numeral 44 denotes a super-resolution layer, numeral 46 denotes a cover layer, numeral 47 denotes a recording layer, numeral 49 denotes a land, and numeral 50 denotes a groove. In the recording-type optical information recording medium of the present example, the recording layer 47 has the function of an optical information recording layer.

In the present example, in order to obtain a medium structure suitable for an optical system with a laser wavelength of 405 nm and a numerical aperture of 0.85, a polycarbonate substrate having an external diameter of 120 mm, an internal diameter of 15 mm, and a thickness of 1.1 mm was used as the substrate 41. Further, a polycarbonate sheet having an external diameter of 119.5 mm, an internal diameter of 23 mm, and a thickness of 0.1 mm was used as the cover layer 46. A reproduction laser was condensed from the side of the cover layer 46, so as to perform reproduction. The substrate 41 was provided with an internal opening with a diameter of 15 mm as a chuck.

The recording-type disk was manufactured in accordance with the following steps. First, an alloy reflective film consisting of 95Ag-2.5Pd-2.5Cu (mol %) was formed as the reflective layer 42 on the polycarbonate substrate wherein a spiral land and groove were formed on the recording surface. The thickness of the film was set to be 200 nm. The film was formed by DC magnetron sputtering using pure Ar gas. For the protective films 43 and 45, an amorphous film of 80ZnS-20SiO$_2$(mol %) was used. The films were formed by RF sputtering using pure Ar gas. For the recording layer 47, a GeSbTe phase change recording film was used. The film was formed by rf sputtering using pure Ar gas.

The cover layer 46 was formed after the films were formed by sputtering. The surface of the substrate comprising the thin films and having a thickness of 1.1 mm was spin-coated with an UV curable resin, and a polycarbonate cover layer having a thickness of 0.085 mm, which had been cut in a circular form with an external diameter of 119.5 mm and an internal diameter of 23 mm, was attached thereto. Next, the substrate was introduced into a vacuum chamber, and it was closely attached to the sheet while carrying out vacuum deaeration up to approximately 1 Pa. The substrate was irradiated with UV light from the cover layer side, so as to cure the UV curable resin. The thickness of the UV resin was adjusted such that the total thickness of the UV curable resin and the cover layer would be 0.1 mm.

A spiral guide groove comprising the land 49 and the groove 50 was formed on the substrate. In the present example, recording was conducted only in the groove 50. The track pitch was set to be 320 nm. The depth of the groove was set to be 22 nm. Recording signals were repetition of a recording pit and a space that correspond to recording signals 2T, 3T, . . . , 8T with respect to a clock signal (IT=69.5 nm). Only one type of recording signals was formed on a particular track, and different signals were recorded on individual tracks. In this examination, the recording pit length of a signal having a minimum mark 2T was set to be 139 nm, and the recording pit length of a signal having a maximum-length mark 8T was set to be 556 nm.

Figure 24:
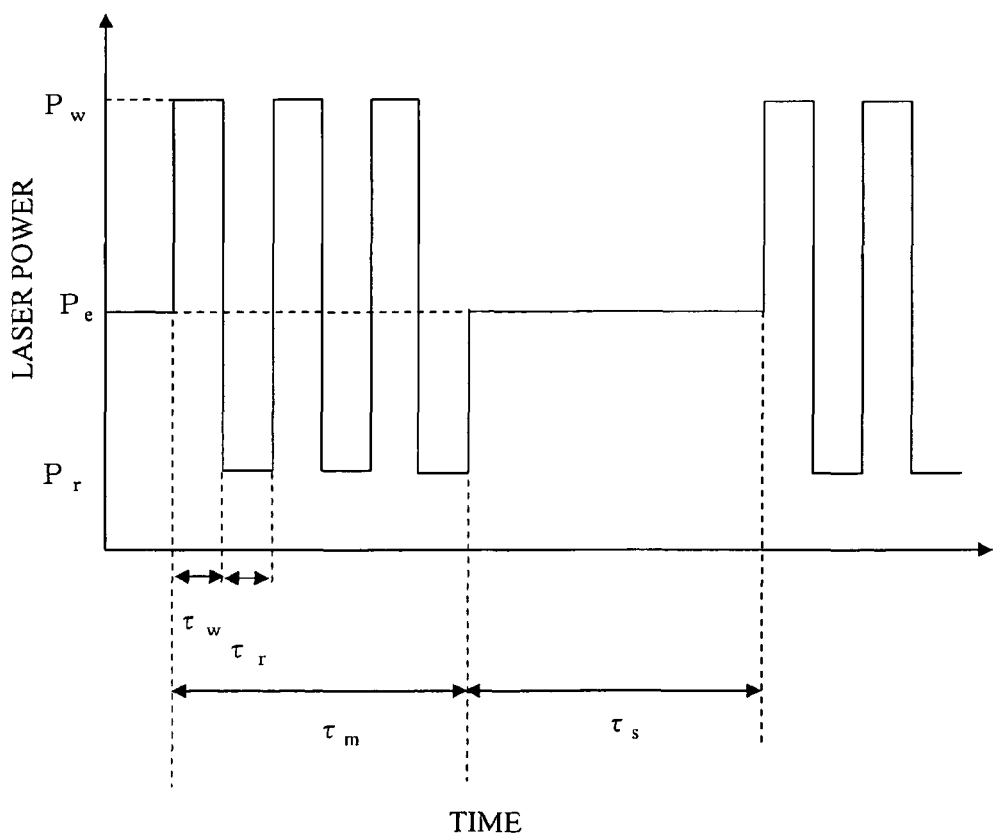
FIG. 24 shows an example of a recording waveform used when recording is performed on the recording-type optical information recording medium.

FIG. 24 shows an example of a recording waveform used for recording. A mark was recorded with a multipulse system in which recording is conducted by irradiation of a plurality of pulses. In the present example, in order to record a mark of nT, a pair of pulses, one having the output of a recording power $P_w$(mW) for $\tau_w$ seconds and the other having the output of a low-power $P_r$ (mW) for $\tau_r$ seconds, was repeatedly emitted (n−1) pairs of times. FIG. 24 shows an example where a 4T mark was formed. This 4T corresponds to $\tau_m$, and a space was recorded by emitting light having a power of $P_e$(mW) for time $\tau_s$, which is the period of time equal to $\tau_m$. Such recording was conducted on one round of a track with the same radius. In the present example, $P_w$, $P_r$, and $P_e$ were set to be 7.2 mW, 0.1 mW, and 4.0 mW, respectively.

In the present example, for the super-resolution layer 44, various materials shown in Table 1 were evaluated.

TABLE 1

| Sample No. | | Composition of Super-resolution film (molar ratio) | Resolution | | Resolution ratio (pulse reproduction/CW reproduction) |
| --- | --- | --- | --- | --- | --- |
| | | | CW reproduction | Pulse reproduction | |
| Examples | 1 | 100Fe$_2$O$_3$ | 0.02 | 0.12 | 6.00 |
| | 2 | 100NiO | 0.03 | 0.13 | 4.33 |
| | 3 | 100CoO | 0.02 | 0.10 | 5.00 |
| | 4 | 100Co$_3$O$_4$ | 0/03 | 0.12 | 4.00 |
| | 5 | 100ZnO | 0.03 | 0.13 | 4.33 |
| | 6 | 100Cr$_2$O$_3$ | 0.02 | 0.11 | 5.50 |
| | 7 | 78GaN—22InN | 0.03 | 0.12 | 4.00 |
| | 8 | 50Fe$_2$O$_3$—50Ga$_2$O$_3$ | 0.02 | 0.14 | 7.00 |
| | 9 | 49ZnS—51ZnSe | 0.03 | 0.13 | 4.33 |
| Comparative | 1 | SiO$_2$ | 0.03 | 0.02 | 0.67 |

Table 1 shows compositions of the super-resolution thin film materials examined in the present example and improvement in resolution of a 2T mark with respect to an 8T mark, based on the pulse reproduction method. Table 1 shows: resolution during reproduction based on CW light with a reproduction power of 0.5 mW; resolution during pulse reproduction in a case where the light emission power of the pulse light emission portion was set to be 6 mW that is lower than the power during recording and the light emission power of the bias light emission portion was set to be 0.5 mW; and the ratio of the resolution during the pulse reproduction with respect to the resolution during the CW reproduction. As a comparative example, Table 1 also shows a case where a $SiO_2$ film that does not exhibit nonlinearity was formed, instead of the super-resolution layer 44. The definition of resolution is the one expressed by the above equation (1).

In samples 1 to 9, $Fe_2O_3$, NiO, CoO, $Co_3O_4$, ZnO, $Cr_2O_3$, 78GaN-22InN, $50Fe_2O_3$-$Ga_2O_3$, 49ZnS-51ZnSe were used for the individual super-resolution layers 44. In any of the cases, it was found that resolution became greater during pulse reproduction compared to resolution during CW reproduction. Further, the ratio of resolution during the pulse reproduction to the resolution during the CW reproduction became as large as 4.0 to 7.0. Particularly, in the case where the $50Fe_2O_3$-$Ga_2O_3$ thin film was used as a super-resolution layer, the ratio of resolution became as large as 7.0. On the other hand, in the case where $SiO_2$ was used instead of the super-resolution layer 44 as the comparative example, while resolution during pulse reproduction was a little lower, the resolution changed little in either case of the CW reproduction and the pulse reproduction.

As described above, an optical disk with high resolution was obtained by performing reproduction on an optical information recording medium in which the super-resolution thin film material of the invention is used, using the pulse reproduction method.

In accordance with an optical information recording/reproducing apparatus using the pulse reproduction method of the invention, reproduction can be performed on an optical information recording medium in which a super-resolution film is formed, and an optical disk having a high resolution with respect to a small recording mark can be manufactured.

What is claimed is:

1. An information reproducing apparatus comprising:
    a medium driving portion for supporting an optical information recording medium comprising a super-resolution layer that exhibits an super-resolution effect when irradiated with a laser light and an optical information recording layer, and for rotating the optical information recording medium;
    a laser light source;
    a laser light emission control portion for controlling a light emission pattern of the laser light source;
    a pick-up for irradiating the rotatable optical information recording medium supported by the medium driving portion with a laser light emitted from the laser light source as a single light spot, and for detecting light reflected from the optical information recording medium;
    a reproduction signal processing unit for performing an arithmetic processing on a signal received by the pick-up;
    wherein the laser light emission control portion causes the laser light source to emit pulsed light in a light emission pattern such that a bias light emission portion and a pulse light emission portion that has higher power than the bias light emission portion alternatively appear within the single light spot, and
    wherein the reproduction signal processing unit obtains a reproduction signal from each of the pulse light emission portion and the bias light emission portion of the light emission pattern, and it outputs the results obtained by performing an arithmetic processing on the reproduction signal obtained from the pulse light emission portion by referring to the reproduction signal obtained from the bias light emission portion, as reproduction data.

2. The information reproducing apparatus according to claim 1, wherein the reproduction signal processing unit comprising:
    a first processing system comprising a sample hold circuit for sample-holding a detection signal based on the pulse light emission portion, a first AD converter circuit, and a first equalizing circuit, the first processing system processing the detection signal from the pulse light emission portion; and
    a second processing system comprising a sample hold circuit for sample-holding a detection signal based on the bias light emission portion, a second AD converter circuit, a second equalizing circuit, and a gain correction circuit, the second processing system processing the detection signal from the bias light emission portion,
    wherein the reproduction data is operated with processing results from the first processing system and the second processing system.

3. The information reproducing apparatus according to claim 2, wherein the reproduction signal processing unit varies the equalization constant of the first equalizing circuit, the equalization constant of the second equalizing circuit, and/or the correction coefficient of the gain correction circuit by using the detection results of the reproduction data operated with the processing results from the first processing system and the second processing system.

4. The information reproducing apparatus according to claim 1, wherein the pulse light emission portion causes the super-resolution layer to be in the state of super-resolution, and the bias light emission portion keeps the super-resolution layer to be in a steady state.

5. An information reproducing method for reproducing information from an optical information recording medium comprising a super-resolution layer and an optical information recording layer, the method comprising:
    irradiating the optical information recording medium with a laser light as a single light spot in a light emission pattern such that a bias light emission portion that keeps the super-resolution layer in a steady state and a pulse light emission portion that causes the super-resolution layer to be in the state of super-resolution alternatively appear within the single light spot;
    detecting the reflected light;
    obtaining a reproduction signal based on the pulse light emission portion and a reproduction signal based on the bias light emission portion; and
    outputting, as reproduction data, the results obtained through an arithmetic processing of the reproduction signal based on the bias light emission portion and the reproduction signal based on the pulse light emission portion.

6. The information reproducing method according to claim 5, wherein the arithmetic processing includes a processing in which the reproduction signal based on the bias light emission portion that is multiplied by a constant is subtracted from the reproduction signal based on the pulse light emission portion.

7. The information reproducing method according to claim 5, wherein reproduction data is obtained by processing the difference between a signal obtained by performing equalization processing on a detection signal based on the pulse light emission portion and a signal obtained by performing equalization processing and gain correction on a detection signal based on the bias light emission portion.

8. The information reproducing method according to claim 7, wherein the equalization constant of an equalizing circuit for performing equalization processing on the detection signal based on the pulse light emission portion, the equalization constant of an equalizing circuit for performing equalization processing on the detection signal based on the bias light emission portion, and/or the correction coefficient of the gain correction circuit are varied with the detection results of the reproduction data.

* * * * *